United States Patent
Wang et al.

(10) Patent No.: US 9,988,787 B1
(45) Date of Patent: Jun. 5, 2018

(54) SYSTEM FOR DETERMINING POSITION OF A VEHICLE

(71) Applicant: Robo Industries, Inc., Houston, TX (US)

(72) Inventors: Liang Wang, Houston, TX (US); Linli Zhang, Houston, TX (US)

(73) Assignee: Robo Industries, Inc., Houston, TX (US)

( * ) Notice: Subject to any disclaimer, the term of this patent is extended or adjusted under 35 U.S.C. 154(b) by 0 days. days.

(21) Appl. No.: 15/071,879

(22) Filed: Mar. 16, 2016

Related U.S. Application Data

(60) Provisional application No. 62/306,285, filed on Mar. 10, 2016.

(51) Int. Cl.
| | |
|---|---|
| *E02F 3/84* | (2006.01) |
| *G01S 19/42* | (2010.01) |
| *G05D 1/02* | (2006.01) |
| *G06K 9/00* | (2006.01) |
| *B60Q 1/14* | (2006.01) |
| *G01C 21/16* | (2006.01) |

(Continued)

(52) U.S. Cl.
CPC .............. *E02F 3/844* (2013.01); *G01S 19/42* (2013.01); *G05D 1/0212* (2013.01); *B60J 10/00* (2013.01); *B60Q 1/143* (2013.01); *B64C 39/02* (2013.01); *G01C 21/16* (2013.01); *G01C 21/34* (2013.01); *G05D 1/00* (2013.01); *G05D 2201/0202* (2013.01); *G06K 9/00* (2013.01)

(58) Field of Classification Search
CPC .......... E02F 3/844; G01S 19/42; G01S 19/13; G01S 7/4802; G01S 7/4814; G01S 7/539; G01S 15/87; G01S 15/88; G01S 17/48; G01S 17/88; G05D 2201/0202; G05D 1/0221; G05D 1/00; G05D 1/0088; B64C 39/02; B64C 39/024; G06K 9/00; G06K 9/00832; G06K 9/00362; B60J 10/00; G01C 21/16; G01C 21/165; G08G 5/04; G08G 9/02; G08G 5/045; B60Q 1/143; B60R 16/037; B60R 21/013; B60R 25/25; B60R 25/252; B60R 25/255; B60R 21/01536; B60R 21/01516; B60R 21/01534; B60R 21/01538; B60R 21/01542; B60R 21/01552; B60R 21/0152; B60R 21/0153; E05F 15/431; E05F 15/43; B60N 2/002
See application file for complete search history.

(56) References Cited

U.S. PATENT DOCUMENTS

| | | |
|---|---|---|
| 8,352,132 B2 | 1/2013 | Omelchenko et al. |
| 8,463,512 B2 | 6/2013 | Hayashi et al. |

(Continued)

*Primary Examiner* — Behrang Badii
(74) *Attorney, Agent, or Firm* — Lee & Hayes, PLLC

(57) ABSTRACT

A system configured to be mounted to a vehicle including an implement. The system may be configured to determine positions, coordinates, rotation angles (pitch, roll, and yaw), and slopes that may be utilized for autonomous control of the vehicle and the implement. In some cases, the sensor system may include a combination of one or more global positioning sensors mounted on top of a vehicle cab, at least one measurement unit mounted on the implement, and/or additional measurement units mounted on the vehicle body to collect data associated with the movement of the vehicle and implement.

20 Claims, 13 Drawing Sheets

(51) Int. Cl.
    *G01C 21/34*    (2006.01)
    *B64C 39/02*    (2006.01)
    *B60J 10/00*    (2016.01)
    *G05D 1/00*     (2006.01)

(56) References Cited

U.S. PATENT DOCUMENTS

| | | | |
|---|---|---|---|
| 8,634,991 B2 | 1/2014 | Douglas | |
| 9,250,086 B1* | 2/2016 | Friend | G01C 21/20 |
| 2008/0051957 A1* | 2/2008 | Breed | B60R 21/01552 |
| | | | 701/36 |
| 2008/0109141 A1* | 5/2008 | Nichols | E02F 3/842 |
| | | | 701/50 |
| 2009/0092284 A1* | 4/2009 | Breed | B60J 10/00 |
| | | | 382/103 |
| 2010/0312428 A1* | 12/2010 | Roberge | A01B 69/007 |
| | | | 701/23 |
| 2012/0130602 A1* | 5/2012 | Omelchenko | E02F 3/842 |
| | | | 701/50 |
| 2012/0174445 A1* | 7/2012 | Jones | A01B 69/007 |
| | | | 37/197 |
| 2014/0022539 A1* | 1/2014 | France | G01C 15/00 |
| | | | 356/139.1 |
| 2014/0121909 A1* | 5/2014 | Fehr | E02F 3/842 |
| | | | 701/50 |
| 2014/0207331 A1* | 7/2014 | Kosarev | G05D 1/0891 |
| | | | 701/34.4 |
| 2014/0324291 A1* | 10/2014 | Jones | E02F 9/2045 |
| | | | 701/41 |
| 2015/0268042 A1* | 9/2015 | Fehr | G01C 9/08 |
| | | | 702/150 |
| 2016/0251835 A1* | 9/2016 | Kitajima | E02F 3/3663 |
| | | | 701/50 |
| 2016/0298316 A1* | 10/2016 | Iwamura | E02F 9/2004 |
| 2017/0016734 A1* | 1/2017 | Gupta | G01C 21/3697 |
| 2017/0227962 A1* | 8/2017 | Cesarano | G05D 1/0088 |

* cited by examiner

SYSTEM FOR DETERMINING POSITION OF A VEHICLE

CROSS-REFERENCE TO RELATED APPLICATION(S)

This application is a non-provisional of and claims priority to U.S. Provisional Application No. 62/306,285, filed on Mar. 10, 2016, and entitled "SYSTEM FOR DETERMINING POSITION OF A VEHICLE" the entirety of which is incorporated herein by this reference thereto.

BACKGROUND

The presence of autonomous vehicles in today's world is becoming more and more common. Often the vehicles utilize Global Navigation Satellite System (GNSS) sensors to recognize a global position of the vehicle based on a global coordinate system. In the area of construction, GNSS sensors have been used to assist in determining an elevation and slope angle associated with grading control of a machine implement. However, the GNSS sensors are expensive and prone to accidents on the construction site.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
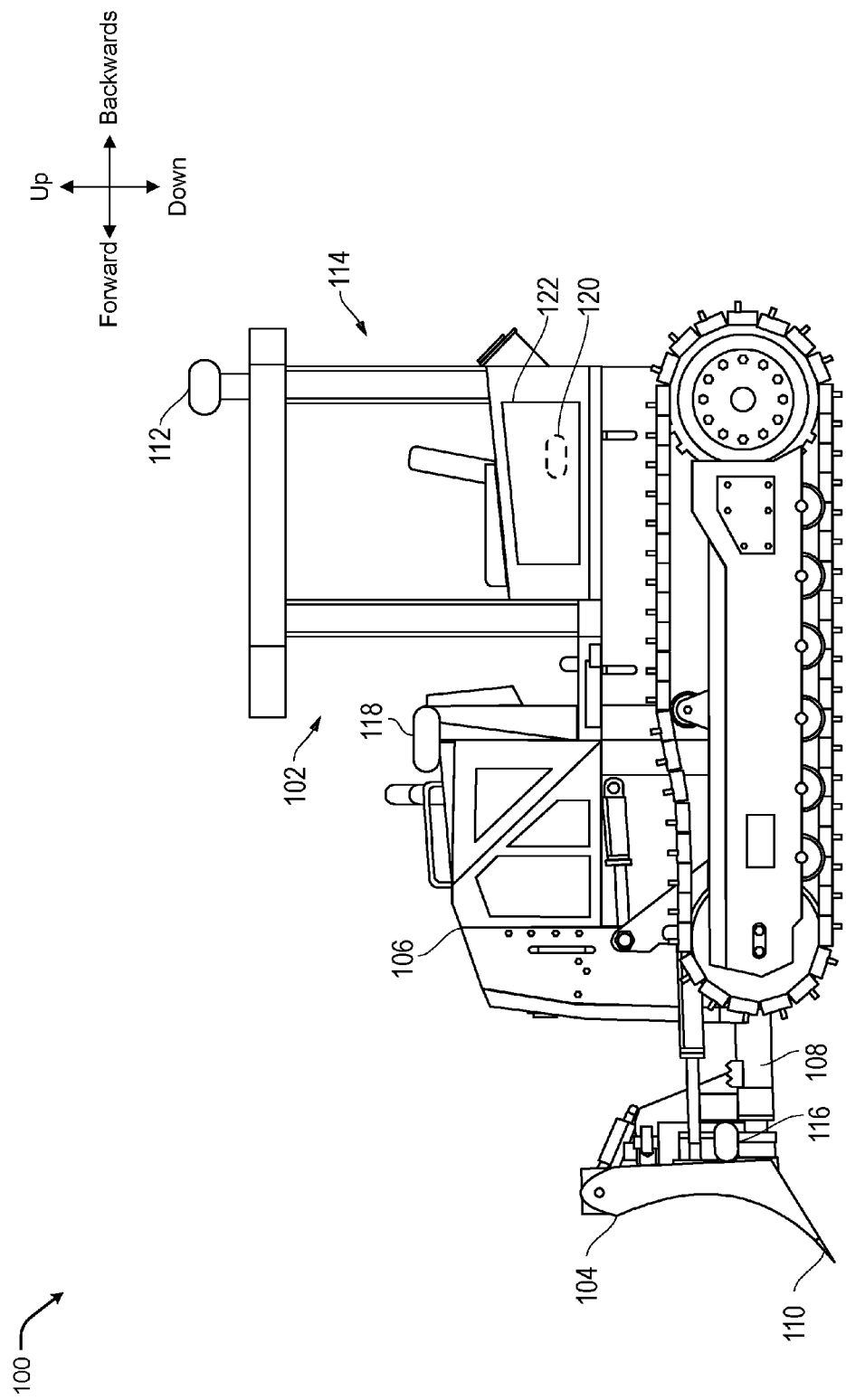
FIG. 1 is a side view of a sensor package system mounted on a vehicle including an implement without independent pitch control according to some implementations.

This disclosure includes techniques and implementations for determining positions, coordinates, rotation angles (e.g., pitch, roll, and yaw), and slopes associated with implement control for operations, such as grading and/or leveling of terrain. In particular, this disclosure describes systems that may be utilized to configure a vehicle having an implement for remote control or automated control. In some cases, the systems may include various sensor package systems placed on a vehicle to collect data related to the movement, angle, direction, and slope of the vehicle which may be utilized to control an implement to provide a desired grade to terrain. For example, the sensor packages may include a combination of one or more global positioning sensor systems or one or more measurement units. In some cases, the global positioning sensor systems may be Global Navigation Satellite System (GNSS) sensors (which may include GNSS antennas, GNSS receivers, Global Positioning System (GPS) antennas and receivers, GLONASS antennas and receivers, GALILEO antennas and receivers, BEIDOU antennas and receivers, as well as other satellite systems antennas and receivers). The measurement units may include internal measurement units (IMU), accelerometers, gyroscopes, magnetometers, or a combination thereof.

In some cases, the system may include sensor package combinations and placements on the vehicle to provide improved protection for the sensors, including expensive GNSS sensors. For example, in some systems a pair of GNSS sensors may be mounted on the implement of the vehicle, such as a cutting blade, shovel, bowl, bucket or blade implement of a bulldozer, for receiving satellite signals and determining the position of the implement relative to the global coordinate system. However, the implement may be exposed to a high level of vibration and impact during terrain leveling operations, in addition to often being contacted by objects, such as rocks and debris. In some cases, the vibration of the implement may be directly transferred to the GNSS sensors and the vibration may inhibit the GNSS sensors from accurately receiving the satellite signal and decoding data contained within the signal.

Additionally, disposing the GNSS sensors on the implement often leads to undesirable damage of the GNSS sensors during use of the vehicle. Repair and/or replacement of the GNSS sensors is expensive and may be time consuming particularly in remote environments, such as gold mines in South America or northern Alaska. In some cases, such as the gold mines in northern Alaska, loss of days to a week of mining may be disastrous due to the weather shortened work periods (as little as a few months) and in some situations can even bankrupt the company.

In other examples, the GNSS sensor or sensors may be placed on the vehicle body and one or more cylinder stroke length sensors may be placed within the hydraulic cylinders that control the implement to protect the GNSS sensors or sensors from dirt, sand, rocks that may damage the unit. However, the cylinder stroke length sensor may be difficult to access in the case of damage or malfunction. Thus, the entire hydraulic cylinder may have to be replaced. Additionally, the hydraulic cylinders are sized for particular vehicle and implements. Thus, the cylinder stroke length sensor may have to be designed for the particular hydraulic system associated with each vehicle model and implement pairing resulting in increased manufacturing costs and limited market for each particular sensor package system.

The sensor package systems, described herein, are mounted with respect to the vehicle to improve reliability of the GNSS sensor, promote accuracy in the received signal data, and flexibility in calculating the global position and angles of an implement over a large range of vehicle and implement combinations. In some cases, the system is designed to provide universal assembly, disassembly and reuse among vehicles or machines of different models and makes.

In some examples, the sensor package system may also be configured to compute the global position for any point associated with the vehicle body or the implement. In some specific instances, such as when the vehicle is being configured for autonomous control and movement, the sensor package system may be configured to compute the global position of a point of interest (POI) of the vehicle body in addition to the global position and angles for a POI associated with the implement. The vehicle body POI is a projection point of the vehicle's gravitational center on the vehicle's or machine's bottom plane. The elevation and angles of the vehicle body POI is a more accurate reflection of the vehicle position with respect to the ground, and may be used for real-time terrain elevation surveying and precise vehicle navigation control. The implement POI may be any point along the bottom of the implement, such that the point contacts the ground. For example, the middle bottom point of a blade, or the bottom right or left hand corner of a bucket.

In one implementation, the sensor package system may be configured to be applied or mounted on a construction machine or vehicle, such as a bulldozer, having a vehicle body and an implement (e.g., cutting blade, a work blade, bucket, shovel, etc.) supported by an implement support extending from the vehicle body. In some cases, the implement support may include a lift frame, one or more hydraulic cylinders (in many cases a pair of hydraulic cylinders) for raising and lowering the implement in relation to the vehicle body, and a tilt cylinder for controlling the lateral tilt of the implement.

In this situation, the system may include a first inertial measurement unit (IMU) configured to be mounted on the implement to determine the implement pitch, roll, and yaw. The first IMU may include one or more accelerometers, one or more gyroscopes, one or more magnetometers, and/or one or more pressure sensors, among others sensors. In one particular example, the first IMU sensor may include three accelerometers placed orthogonal to each other, three rate gyroscopes placed orthogonal to each other, three magnetometers placed orthogonal to each other, and a barometric pressure sensor. In some implementations, an implement angle obtaining part or module store and executed in association with a control unit may receive the implement pitch, roll and yaw angle measurements from the first IMU mounted on the implement.

In this example, a GNSS sensor may be mounted on the top of the vehicle body. In another example, the GNSS antenna may be mounted on top of the vehicle body and the GNSS receiver may be mounted within the cab or engine compartment of the vehicle. In the case of a GNSS antenna being mounted on top of the vehicle body, the GNSS receiver may be in communication (e.g., wireless communication or wired communication) with the GNSS antenna to receive and decode the satellite signal. The GNSS antenna may receive a GNSS signal from a satellite and send the GNSS signal (or data related to the signal) to the GNSS receiver. The GNSS receiver may decode the signal to determine a position of the GNSS antenna in the global coordinate system. The GNSS antenna and GNSS receiver may be provided as a single package, herein referred to as a GNSS sensor.

A second IMU may be mounted on the vehicle body to determine the pitch, roll, and yaw of the vehicle body. In some cases, the second IMU may include one or more accelerometers, one or more gyroscopes, one or more magnetometers, and/or one or more pressure sensors, among others sensors. In one particular example, the second IMU may include three accelerometers placed orthogonal to each other, three rate gyroscopes placed orthogonal to each other, three magnetometers placed orthogonal to each other, and a barometric pressure sensor. In some cases, a vehicle body angle obtaining part or module stored and execution in association with the control unit may receive or determine the vehicle body pitch, roll, and yaw angle measurements from the second IMU.

A position recognizing system or control unit (such as a processor, a processing unit, a computational unit, etc.) may be configured process the vehicle body rotation angles (e.g., the vehicle body pitch, roll, and yaw from the second IMU), the global position of the GNSS sensor (e.g., the global position of the vehicle body) measured by the GNSS sensor. For example, the pitch, roll, and yaw angles measured by the second IMU may be assigned to the vehicle body POI as the second IMU and the vehicle body POI are on the same access. The position recognizing system may also estimate the vehicle body POI using geometric offsets between a GNSS sensor center and the vehicle body POI and the global position of the GNSS sensor. For example, the geometric offsets may be measured or determined during installation of the sensor package system on the vehicle to tailor the system for the particular vehicle. In one specific example, the position recognizing system may apply a Kalman filter to fuse the GNSS data with the IMU data.

The position recognizing system may also process the implement rotation angles (e.g., the pitch, roll, and yaw of the blade), the global position of the GNSS sensor (e.g., the global position of the vehicle body) measured by the GNSS sensor, connection relationship between the implement and vehicle body (e.g., the length of the lift frame), and geometric offsets between the implement POI and a series of reference points relative to the vehicle body to estimate the elevation and slope angle for the implement. For example, the reference point may include the vehicle body POI, an attachment point of the implement support or lift frame, a point selected based at least in part on the attachment point of the implement support or lift frame, an attachment point of the implement to the implement support or lift frame, among others. In one specific example, the implement rotation angles may be assigned based on the angles measured by the first IMU and the position of the implement POI may be determined using the GNSS sensor position information, various references points, and the geometric offsets between the GNSS sensor, the various reference points, and the implement POI.

In another implementation, a sensor package system including two GNSS sensors may be configured to be applied or mounted on a construction machine or vehicle, such as a bulldozer, having a vehicle body and an implement (e.g., cutting blade, bucket, shovel, a work implement, etc.) supported by an implement support extending from the vehicle body, as described above. Again, the implement support may include a lift frame, one or more hydraulic cylinders (in many cases a pair of hydraulic cylinders) for raising and lowering the implement in relation to the vehicle body, a blade tilt cylinder for controlling the lateral tilt of the implement, and one or more angling cylinders (in many cases a pair of angling cylinders) for controlling the angling rotation of the implement.

In this implementation, a first IMU may again be mounted on the implement to provide the blade pitch, roll, and yaw angles. However, in this implementation, two GNSS sensors are mounted on the top of the vehicle body. Each of the two GNSS sensors may be placed along the longitudinal axis of the vehicle body and/or along the lateral axis of the vehicle body. In both arrangements, a fixed distance between two GNSS sensors may be determined or measured during installation to assist with determining the vehicle body global position.

A second IMU may be mounted on the vehicle body, as described above. In this implementation, the vehicle body angle obtaining module of the position recognizing system may receive pitch, roll, and yaw angles from the second IMU and calculate the vehicle body pitch, roll, and yaw angles based on the pitch, roll, and yaw angles received form the second IMU, the two global position of the GNSS sensors, and the fixed distance between the two GNSS sensors measured during installation. For example, the vehicle body angle obtaining module may differentiate the two global position coordinates measured by the GNSS sensors to determine either the vehicle body pitch and yaw angles or the vehicle body roll and yaw angles depending on the arrangement of the two GNSS sensors. The vehicle body angle obtaining part may obtain the missing angle (e.g., either the vehicle body roll or the vehicle body pitch) from the second IMU measurements. In some cases, by utilizing two GNSS sensors to estimate two of the three rational angles (e.g., the roll, pitch, and yaw) of the vehicle body a more accurate estimation of the vehicle position relative to the ground or training may be obtained to, thereby, improve the accuracy of associated with the movement of the implement.

As discussed above, a position recognizing system may be configured to process the vehicle body rotation angles (e.g., the vehicle body pitch, roll, and yaw from the second IMU and/or the vehicle body angle obtaining part), the global position of the GNSS sensors, and geometric offsets between a location associated with the two GNSS sensors and the vehicle body POI, to estimate the global position of the vehicle body POI. The geometric offsets may be measured or determined during installation of the sensor package system on the vehicle to tailor the system for the particular vehicle.

The position recognizing system may also process the implement rotation angles (e.g., the pitch, roll, and yaw of the blade from the first IMU), the global position of the vehicle body, connection relationship between the implement and vehicle body (e.g., the length of the lift frame), and the geometric offsets between the implement POI and a series of reference points relative to the vehicle body, to calculate the elevation and slope angle for the implement. For example, s discussed above, the reference point may include the vehicle body POI, an attachment point of the implement support or lift frame, a point selected based at least in part on the attachment point of the implement support or lift frame, an attachment point of the implement to the implement support or lift frame, among others. In one specific example, the implement rotation angles may be assigned based on the angles measured by the first IMU and the two GNSS sensors and the position of the implement POI may be determined using a GNSS reference position, various references points, and the geometric offsets between the GNSS sensor, the various reference points, and the implement POI.

In another implementation, the sensor package system including three GNSS sensors may be configured to be applied or mounted on a construction machine or vehicle, such as a bulldozer, having a vehicle body and an implement (e.g., cutting blade, bucket, shovel, a work implement, etc.) supported by an implement support extending from the vehicle body. Again, the implement support may include a lift frame, one or more hydraulic cylinders (in many cases a pair of hydraulic cylinders) for raising and lowering the implement in relation to the vehicle body, and a tilt cylinder for controlling the lateral tilt of the implement.

In this implementation, a first IMU may be disposed on the implement, as discussed above. Again, an implement angle obtaining module may receive the implement pitch, roll and yaw angle measurements from the first IMU. In this implementation, three GNSS sensors may be mounted on the top of the vehicle body (e.g., a first GNSS sensor, a second GNSS sensor, and a third GNSS sensor). The first and second GNSS sensors may be placed on the lateral axis of the vehicle body with a known or fixed spacing. The placement of the first GNSS sensor and the second GNSS sensor may result in a symmetrical distribution to the longitudinal axis of the vehicle body. The third GNSS sensor may be placed on the center part of the vehicle body.

A vehicle body angle obtaining module calculates the vehicle body pitch, roll, and yaw angles by using three global position coordinates measured by the GNSS sensors and the known distance between each GNSS sensor measured during installation. A position recognizing system may determine the position for the vehicle body POI, elevation, and slope angle for the implement. For example, the position recognizing system may estimate the global position of the vehicle body POI. The position recognizing system may determine the elevation and slope angle for the implement based on the vehicle body POI, the implement rotation angles, the connection relationship between the implement and vehicle body (e.g., the length of the lift frame), and the geometric offsets between the implement POI and a series of reference points relative to the vehicle body.

In yet another implementation, the sensor package system may be configured to be applied or mounted on a construction machine having a vehicle body and an implement supported by an implement support extending from the vehicle body. Unlike, the previous examples, in the current implementation, the implement support includes one or more pitch and tilt cylinders for controlling the pitch and tilt of the implement independent of the pitch/tilt of the vehicle body in addition to a lift frame and one or more hydraulic cylinders for raising and lowering the implement in relation to the vehicle body.

In this implementation, the sensor package system may include a position recognizing system that calculates the vehicle body POI as well as the elevation and the slope angle for the implement using any of the sensor packages described above. For example, the sensor package system may include (1) a single GNSS sensor, a first IMU on the implement, and a second IMU on the vehicle body, (2), two GNSS sensors, a first IMU on the implement, and a second IMU on the vehicle body, or (3) three GNSS sensors and a single IMU on the implement.

The sensor package system of the current implementation may also include a lift frame IMU mounted on the lift frame. In some cases, the lift frame IMU may be a gyroscope. In other cases, the lift frame IMU may include additional gyroscopes, accelerometers, magnetometers, and/or pressure sensors. The lift frame IMU package may be mounted on the lift frame to assist in determining the pitch angle of the lift frame (or in the case of an IMU mounted on the lift frame the pitch, roll, and yaw of the lift frame). Using the angles of the lift frame obtained via the lift frame IMU or gyroscope and the implement pitch, roll, and yaw from the second IMU on the implement, the rotational angles of the implement POI and the position of the implement POI are determined. For instance, in one particular example, the rotational angles of the second IMU may be used as the rotational angles of the implement POI and the position recognizing system may determine the implement POI using the rotation angles (e.g., pitch, roll, and yaw) of the lift frame, one or more geometric offsets, and the position data determined using the GNSS sensors.

In this implementation, a position recognizing system may determine an elevation and slope angle for the implement based at least in part on the implement pitch, roll, and yaw angles from the first IMU, the pitch angle of the lift frame (or the pitch, roll, and yaw of the lift frame), the global position of the vehicle body, connection relationship between the implement and vehicle body (e.g., the length of the lift frame), and geometric offsets between the implement POI, and a series of reference points relative to the vehicle body.

FIG. 1 is a side view of a sensor package system 100 mounted on a vehicle 102 including an implement 104 according to some implementations. In this example, the vehicle 102 does not include pitch cylinders for controlling the pitch of the implement 104 independent of the pitch of the lift frame 108. In the current example, the vehicle 102 is a bulldozer but it should be understood that the sensor package system 100 may be applied to any vehicle including an implement 104, such as a blade, bucket, shovel, or scope.

The vehicle 102 includes the vehicle body 106 and the implement 104. The implement 104 is attached or connected to the vehicle body 106 via a lift frame 108. The implement 104 is, generally, disposed forward of the vehicle body 106 and supported by the lift frame 108. In the current example, the implement 104 includes a cutting edge 110 that may contact the ground during operations of the vehicle 102 including sloping, digging, leveling, grading, etc. However, in other examples, the implement may be a bucket or shovel with teeth, rippers, or a bottom that contacts the ground during operation. In the current example, the implement 104 is configured to be lifted up and down in conjunction with the motion of the lift frame 108.

The lift frame 108 may pivot vertically about an axis (not shown) in a lateral direction (right and left direction from the front of the vehicle 102). In the current example, the lift frame 108 supports the implement 104 through a ball-and-socket joint, a pitching support link, and a bracing structure (not shown). However, the implement 104 may be supported by the lift frame 108 in other ways.

The sensor package system 100 installed or mounted on the vehicle 102 may include a GNSS sensor 112. The GNSS sensor 112 may be disposed on the top of the vehicle body 106 (for example, on top of a cab 114 associated with the vehicle body 106). The GNSS sensor 112 may include one or more antennas for receiving satellite signals and one or more receivers or other components for decoding the satellite signals and determining a global position of the GNSS sensor 112. In some cases, the satellite signals received by the GNSS sensor 112 may be in various formats or standards, such as GPS, GLONASS, Galileo, BeiDou as well as other satellite navigation standards. The GNSS sensor 112 may have a different arrangement on top of the vehicle body 106. For instance, the GNSS sensor 112 may be disposed on the center of the vehicle body 106 as illustrated with respect to FIG. 2 below.

The sensor package system 100 installed or mounted on the vehicle 102 may also include a first IMU 116 disposed on the implement 104. The first IMU 116 may include one or more accelerometers, one or more gyroscopes, one or more magnetometers, and/or one or more pressure sensors, among others sensors. In one particular example, the first IMU 116 may include three accelerometers placed orthogonal to each other, three rate gyroscopes placed orthogonal to each other, three magnetometers placed orthogonal to each other, and a barometric pressure sensor. The placement of the first IMU 116 on the implement 104 allows the first IMU 116 to collect data related to the motion and angles of the implement 104. The first IMU 116 may be associated with an implement angle obtaining module associated with a position recognizing system 120, discussed below, to determine a pitch, roll and yaw angle of the implement 104.

The sensor package system 100 installed or mounted on the vehicle 102 may also include a second IMU 118 disposed on the vehicle body 106. The second IMU 118 may be mounted on the vehicle body 106 to determine the pitch, roll, and yaw angles of the vehicle body 106 independent of the implement 104 pitch, roll, and yaw angles. In some cases, the second IMU 118 may also include one or more accelerometers, one or more gyroscopes, one or more magnetometers, and/or one or more pressure sensors, among others sensors. The placement of the second IMU 118 on the vehicle body 106 allows the second IMU 118 to collect data related to the motion and angles (pitch, roll, and yaw) of the vehicle body 106. The second IMU 118 may be associated with a vehicle body angle part to assist in calculating the pitch, roll, and yaw angle measurements of the vehicle body 106.

The first IMU 116 and/or the implement angle obtaining model associated with the position recognizing system 120 may be configured to send the pitch, roll, and yaw of the implement 104 to a position recognizing system 120 mounted within an cab compartment 122 (or alternatively within an engine compartment) of the vehicle 102. Similarly, the second IMU 118 and/or the vehicle body angle model may be configured to send the pitch, roll, and yaw of the vehicle body 106 associated with the position recognizing system 120. In some cases, the position recognizing system 120 may receive the global position data from GNSS sensor 112.

The position recognizing system 120 may be configured to calculate a global position of a vehicle body POI (not shown) and a implement POI (not shown) based pitch, roll, and yaw of the implement 104, the pitch, roll, and yaw of the vehicle body 106, the global position of the GNSS sensor 112, and various geometric relations or offsets associated with the vehicle body 106, the lift frame 108 and implement 104, described in more detail below.

Figure 2:
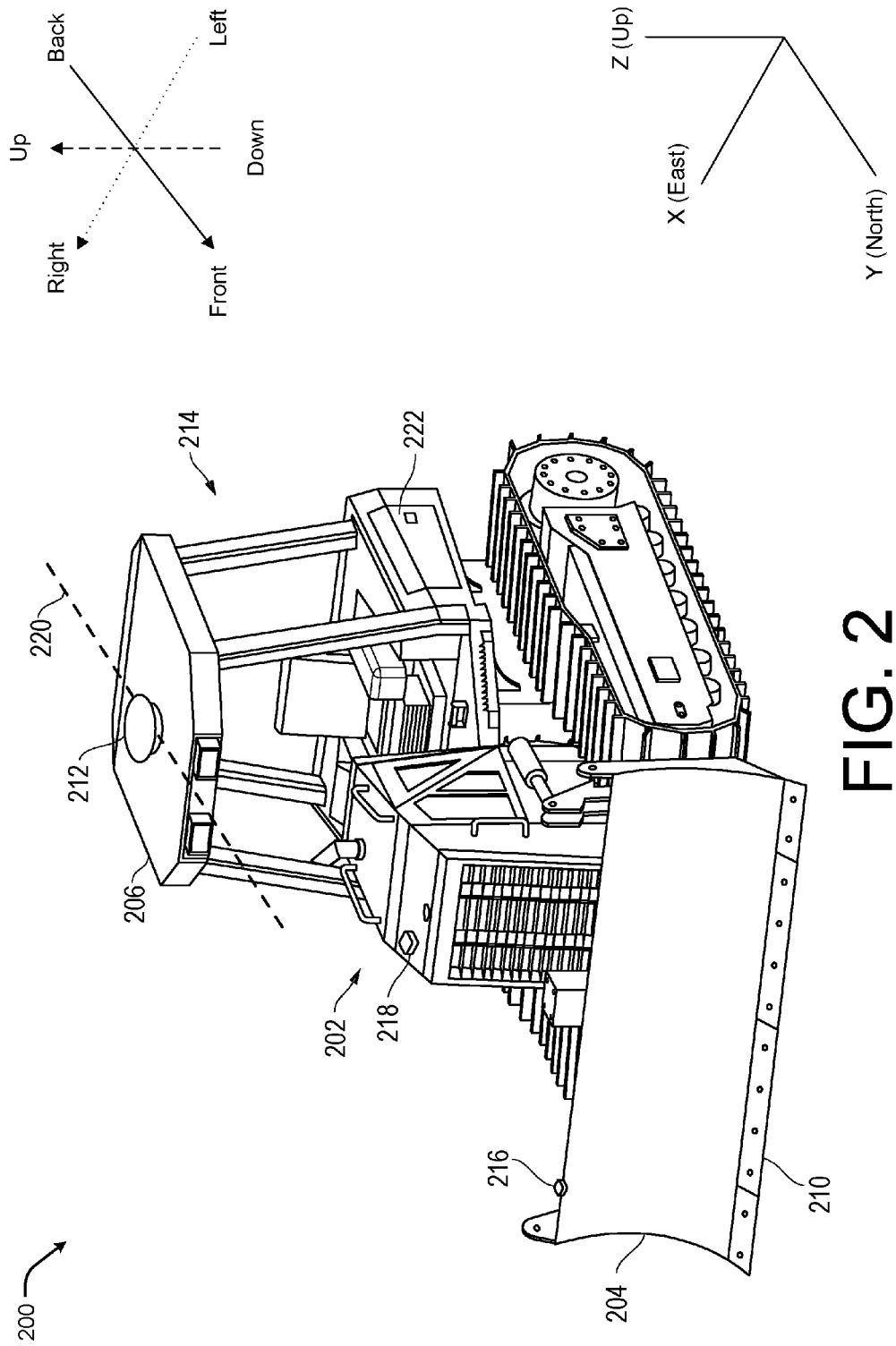
FIG. 2 is an orthogonal view of a sensor package system mounted on a vehicle including an implement without independent pitch control according to some implementations.

FIG. 2 is an orthogonal view of a sensor package system 200 mounted on a vehicle 202 including an implement 204 according to some implementations. As in FIG. 1, in this example, the vehicle does not include pitch cylinders for controlling the pitch of the implement 204 independent of the pitch of the lift frame 208. In the current example, the vehicle 202 is a bulldozer but it should be understood that the sensor package system 200 may be applied to any vehicle including an implement 204.

The vehicle 202 includes the vehicle body 206 and the implement 204. The implement 204 is attached or connected to the vehicle body via a lift frame (not shown). The implement 204 is, generally, disposed forward of the vehicle body 202 and supported by the lift frame 208. In the current example, the implement 204 includes a cutting edge 210 which contacts the ground during operations of the vehicle 202 including sloping, digging, leveling, grading, etc. The implement 204 is configured to be lifted up and down in conjunction with the motion of the lift frame 208.

The lift frame 208 may pivot vertically about an axis (not shown) in a lateral direction (right and left direction from the front of the vehicle 202). In the current example, the lift frame 208 supports the implement 204 through a ball-and-socket joint, a pitching support link, and a bracing structure (not shown). However, the implement 204 may be supported by the lift frame 206 in other ways.

The sensor package system 200 installed or mounted on the vehicle 202 may include a GNSS sensor 212. The GNSS sensor 212 may be disposed on the top of the vehicle body 206 (for example, on top of a cab 214 associated with the vehicle body 206). The GNSS sensor 212 may include one or more antennas for receiving satellite signals and one or more registered or other components for decoding the satellite signal and determining a global position of the GNSS sensor 212. In the illustrated example, the GNSS sensor 212 is disposed on the center line, 220 of the vehicle body 206. In the current example, the GNSS sensor 212 is positioned relative to the center of the cab 214, however, in other instances, such as the illustrated example of FIG. 1, the GNSS sensor 212 may be positioned further back along the center line 220. Thus, it should be understood, that in this example, the GNSS sensor 212 may be positioned along any point along the center line 220 or, in alternative implementations, at any location on the vehicle body 206.

The sensor package system 200 installed or mounted on the vehicle 202 may also include a first IMU 216 disposed on the implement 204. The first IMU 216 may include one or more accelerometers, one or more gyroscopes, one or more magnetometers, and/or one or more pressure sensors, among others sensors. In one particular example, the first IMU 216 may include three accelerometers placed orthogonal to each other, three rate gyroscopes placed orthogonal to each other, three magnetometers placed orthogonal to each other, and a barometric pressure sensor.

In the illustrated example, the first IMU 216 is shown as positioned at the upper corner of the implement 204. However, in other examples, the first IMU 216 may be placed at other locations along the implement 204, such as at the top center. The placement of the first IMU 216 on the implement 204 allows the first IMU 216 to collect data related to the motion and angles of the implement 204. The first IMU 216 may be associated with an implement angle obtaining model (not shown) to determine a pitch, roll and yaw angle of the implement 204.

The sensor package system 200 installed or mounted on the vehicle 202 may also include a second IMU 218 disposed on the vehicle body 206. The second IMU 218 may be mounted at any location on the vehicle body 206 (including the top of the cab 214) to determine the pitch, roll, and yaw angles of the vehicle body 206 independent of the implement 204 pitch, roll, and yaw angles. In some cases, the second IMU 218 may also include one or more accelerometers, one or more gyroscopes, one or more magnetometers, and/or one or more pressure sensors, among others sensors. The placement of the second IMU 218 on the vehicle body 206 allows the second IMU 218 to collect data related to the motion and angles of the vehicle body 206. The second IMU 218 may be associated with a vehicle body angle part to calculate the pitch, roll, and yaw angle measurements of the vehicle body 206.

The first IMU 216 and/or the implement angle obtaining part may be configured to send the pitch, roll, and yaw of the implement 204 to a position recognizing system (not shown) mounted within a cab compartment 222 of the vehicle 202. Alternatively, the position recognizing system may be mounted within an engine compartment or vehicle body case for protection. Similarly, the second IMU 218 and/or the vehicle body angle part may be configured to send the pitch, roll, and yaw of the vehicle body 206 to the position recognizing system.

The position recognizing system (not shown) may be configured to calculate a global position of a vehicle body POI (not shown) and a implement POI (not shown) based pitch, roll, and yaw of the implement 204, the pitch, roll, and yaw of the vehicle body 206, the global position of the GNSS sensor 212, and various geometric relations or offsets associated with the vehicle body 206, the lift frame and implement 204, described in more detail below.

Figure 3:
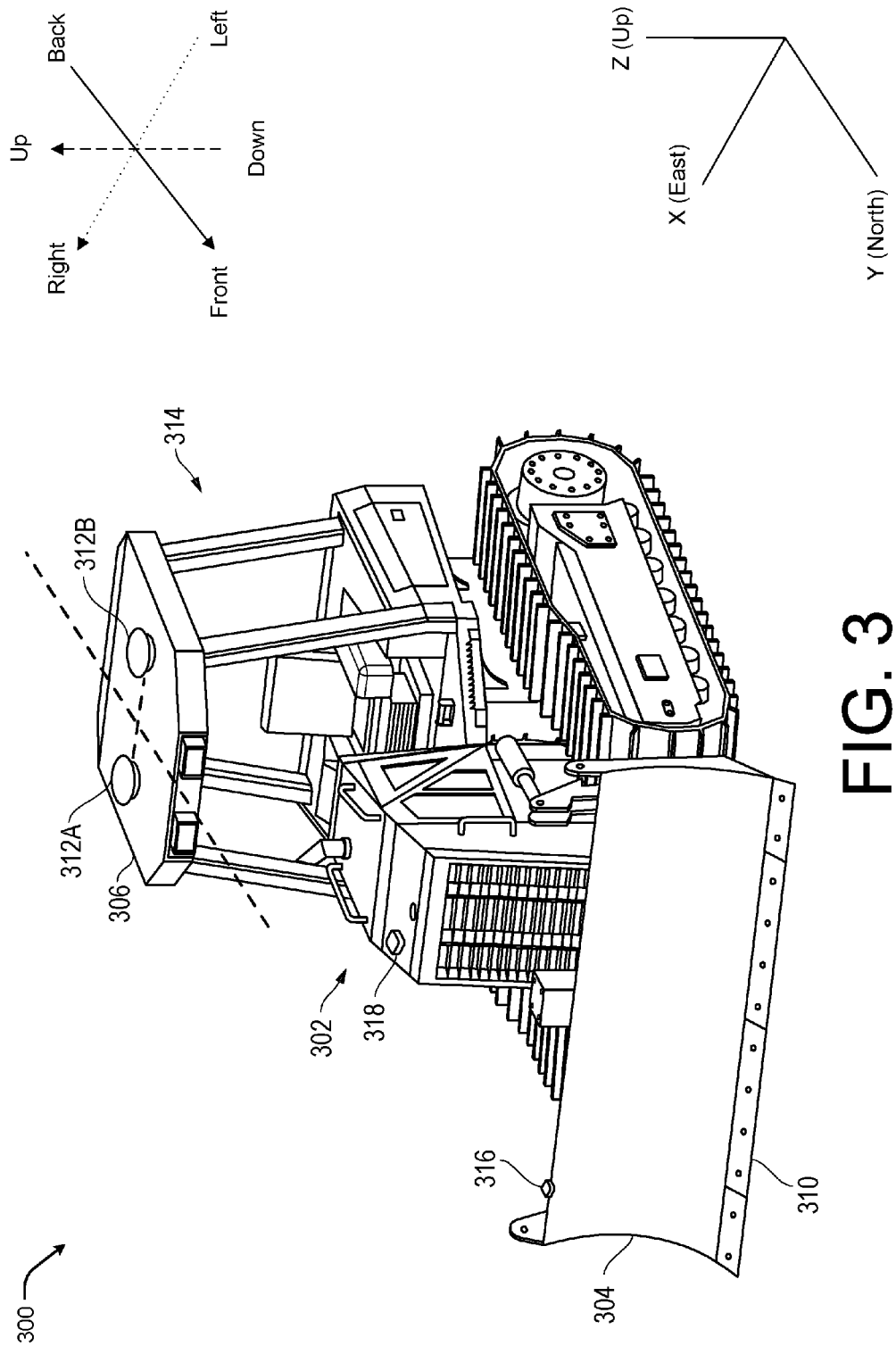
FIG. 3 is an orthogonal view of another sensor package system mounted on a vehicle including an implement without independent pitch control according to some implementations.

FIG. 3 is another orthogonal view of a sensor package system 300 mounted on a vehicle 302 including an implement 304 according to some implementations. In this example, the vehicle 302 does not include pitch cylinders for controlling the pitch of the implement 304 independent of the pitch of the lift frame 308. In the current example, the vehicle 302 is a bulldozer but it should be understood that the sensor package system 300 may be applied to any vehicle including an implement 304.

The vehicle 302 includes the vehicle body 306 and the implement 304. The implement 304 is attached or connected to the vehicle body 306 via a lift frame (not shown). The implement 304 is, generally, disposed forward of the vehicle body 306 and supported by the lift frame. The implement 304 includes a cutting edge 310 which contacts the ground during operations of the vehicle 302 including sloping, digging, leveling, grading, etc. The implement 304 is configured to be lifted up and down in conjunction with the motion of the lift frame.

The sensor package system 300 installed or mounted on the vehicle 302 may include a first GNSS sensor 312(A) and a second GNSS sensor 312(B). The first GNSS sensor 312(A) and the second GNSS sensor 312(B) may be disposed on the top of the vehicle body 306. For instance, in the illustrated example, first GNSS sensor 312(A) and the second GNSS sensor 312(B) are both disposed on top of a cab 314 associated with the vehicle body 306. Each of the GNSS sensors 312(A) and 312(B) may include one or more antennas for receiving satellite signals and one or more registered or other components for decoding the satellite signal and determining a global position associated with each of the GNSS sensors 312(A) and 312(B).

In the illustrated example, the first GNSS sensor 312(A) and the second GNSS sensor 312(B) are aligned along a lateral axis of the vehicle body 306 to provide positioning data and roll angles and yaw angles of the vehicle body 306. A known or fixed distance between the first GNSS sensor 312(A) and the second GNSS sensor 312(B) is measured during installation.

By utilizing the first GNSS sensor 312(A) and the second GNSS sensor 312(B) with a known or fixed distance between them, the system 300 may differentiate the two global position coordinates measured by the first GNSS sensor 312(A) and the second GNSS sensor 312(B) to determine the roll and yaw angles of the vehicle body 306, as well as the global position of the vehicle 302. In this implementation, the use of the second GNSS sensor 312(B) to assist in determining two of the three rational angles in lieu a single IMU sensor allows for a more accurate measurement which in turn allows for more fine-tuned or precise control of the implement 304 during operation. Additionally, utilizing two GNSS sensors 312(A) and 312(B) may allow for a more accurate calculation of the global position of the vehicle body 306.

The sensor package system 300 installed or mounted on the vehicle 302 may also include a first IMU 316 disposed on the implement 304. The first IMU 316 may include one or more accelerometers, one or more gyroscopes, one or more magnetometers, and/or one or more pressure sensors, among others sensors. In one particular example, the first IMU 316 may include three accelerometers placed orthogonal to each other, three rate gyroscopes placed orthogonal to each other, three magnetometers placed orthogonal to each other, and a barometric pressure sensor. The placement of the first IMU 316 on the implement 304 allows the first IMU 316 to collect data related to the motion and angles (pitch, roll, and yaw) of the implement 304. The first IMU 316 may send data to the position recognizing system for calculating the pitch, roll and yaw angle of the implement 304.

The sensor package system 300 installed or mounted on the vehicle 302 may also include a second IMU 318 disposed on the vehicle body 306. The second IMU 318 may be mounted on the vehicle body 302 to determine the missing rational angle (e.g., the pitch of the vehicle body 302 in the illustrated example) that is not determined using the data collected by the first GNSS sensor 312(A) and the second GNSS sensor 312(B). In some cases, the second IMU 318 may also include one or more accelerometers, one or more gyroscopes, one or more magnetometers, and/or one or more pressure sensors, among others sensors.

The first IMU 316 may be configured to send the pitch, roll, and yaw of the implement 304 to a position recognizing system mounted within an engine compartment or cab compartment of the vehicle 302. Similarly, the second IMU 318 and/or the vehicle body angle part may be configured to send either the pitch or roll angles of the vehicle body 306 to the position recognizing system. The position recognizing system may also receive global position data representative of the first GNSS sensor 312(A) and the second GNSS sensor 312(B) and determine the remaining two angles of the vehicle body 306 as well as the vehicle body POI global position using a location of the global position of a GNSS reference point (for instance, a position of the GNSS sensor 312(A), the second GNSS sensor 312(B), or a location between the two GNSS sensors 312(A) and (B)), the rotational angels of the vehicle body 306, the known or fixed geometric offset (measured in the (X, Y, Z) dimensions) between the GNSS reference point) and the vehicle body POI.

Figure 4:
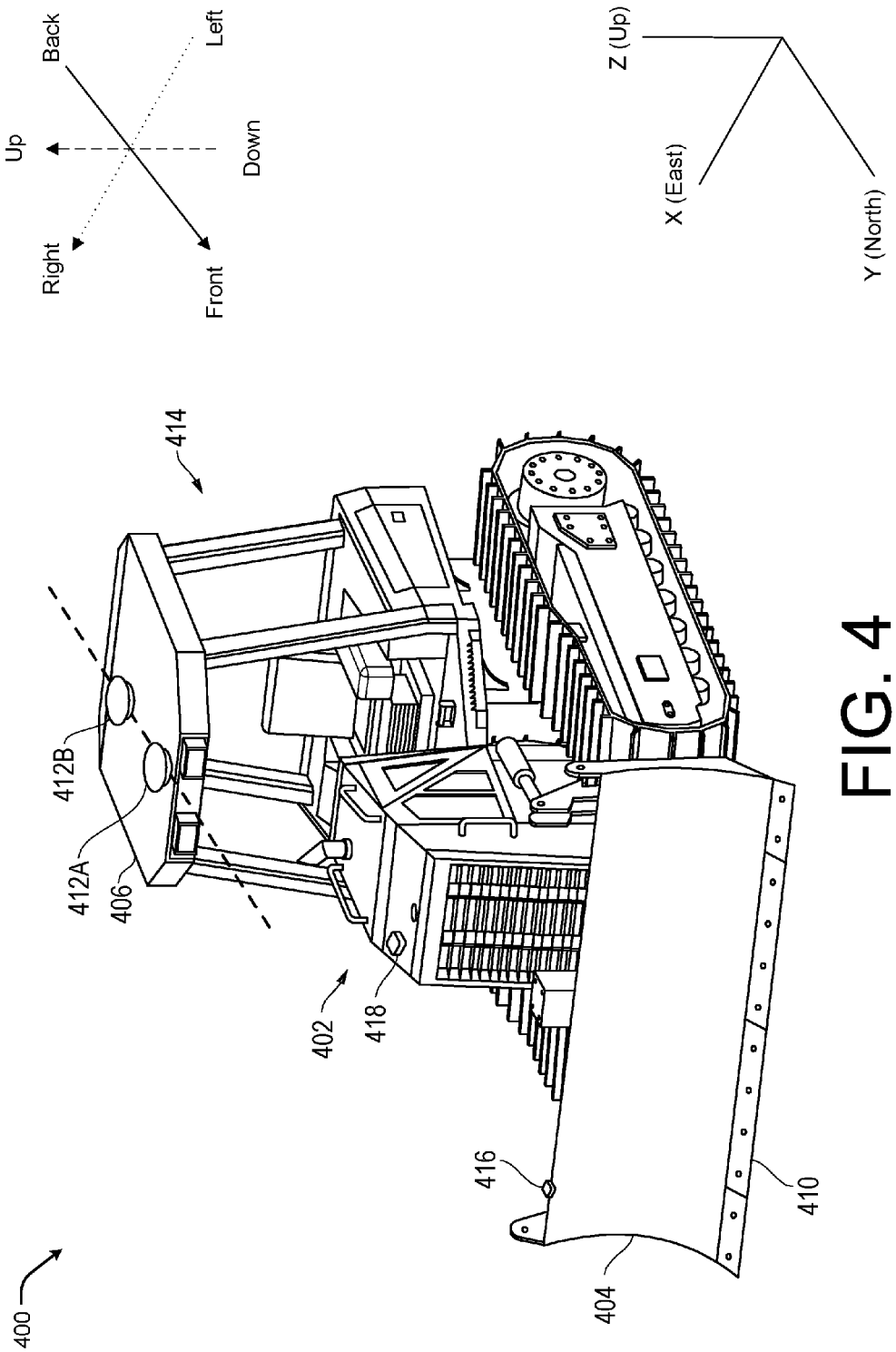
FIG. 4 is an orthogonal view of another sensor package system mounted on a vehicle including an implement without independent pitch control according to some implementations.

FIG. 4 is another orthogonal view of a sensor package system 400 mounted on a vehicle 402 including an implement 404 according to some implementations. In this example, the vehicle 402 does not include pitch cylinders for controlling the pitch of the implement 404 independent of the pitch of the lift frame 408. As in the examples above, the vehicle 402 is a bulldozer but it should be understood that the sensor package system 400 may be applied to any vehicle including an implement 404.

The vehicle 402 includes the vehicle body 406 and the implement 404. The implement 404 is attached or connected to the vehicle body 406 via a lift frame (not shown). The implement 404 is, generally, disposed forwards of the vehicle body 406 and supported by the lift frame. The implement 404 includes a cutting edge 410 which contacts the ground during operations of the vehicle 402 including sloping, digging, leveling, grading, etc. The implement 404 is configured to be lifted up and down in conjunction with the motion of the lift frame.

The sensor package system 400 installed or mounted on the vehicle 402 may include a first GNSS sensor 412(A) and a second GNSS sensor 412(B). The first GNSS sensor 412(A) and the second GNSS sensor 412(B) may be disposed on the top of the vehicle body 406. For instance, in the illustrated example, first GNSS sensor 412(A) and the second GNSS sensor 412(B) are both disposed on top of a cab 414 associated with the vehicle body 406. Each of the GNSS sensors 412(A) and 412(B) may include one or more antennas for receiving satellite signals and one or more registered or other components for decoding the satellite signal and determining a global position associated with each of the GNSS sensors 412(A) and 412(B).

In the illustrated example, the first GNSS sensor 412(A) and the second GNSS sensor 412(B) are aligned a longitudinal axis of the vehicle body 406 to provide positioning data, pitch and yaw angles of the vehicle body 406. A known or fixed distance between the first GNSS sensor 412(A) and the second GNSS sensor 412(B) may be measured during installation.

By utilizing the first GNSS sensor 412(A) and the second GNSS sensor 412(B) with a known or fixed distance between them, the system 400 may differentiate the two global position coordinates measured by the first GNSS sensor 412(A) and the second GNSS sensor 412(B) to determine either the vehicle body pitch and yaw angles, as well as the global position of the vehicle 402. In this implementation, the use of the second GNSS sensor 412(B) to assist in determining two of the three rational angles in lieu a single IMU sensor allows for a more accurate measurement which in turn allows for more fine-tuned or precise control of the implement 404 during operation. Additionally, utilizing two GNSS sensors 412(A) and 412(B) may allow for a more accurate calculation of the global position of the vehicle body 406.

The sensor package system 400 installed or mounted on the vehicle 402 may also include a first IMU 416 disposed on the implement 404. The first IMU 416 may include one or more accelerometers, one or more gyroscopes, one or more magnetometers, and/or one or more pressure sensors, among others sensors. In one particular example, the first IMU 416 may include three accelerometers placed orthogonal to each other, three rate gyroscopes placed orthogonal to each other, three magnetometers placed orthogonal to each other, and a barometric pressure sensor. The placement of the first IMU 416 on the implement 404 allows the first IMU 416 to collect data related to the motion and angles (pitch, roll, and yaw) of the implement 404. The first IMU 416 may be associated with an implement angle obtaining part (not shown) that may assist in calculating the pitch, roll and yaw angle of the implement 404.

The sensor package system 400 installed or mounted on the vehicle 402 may also include a second IMU 418 disposed on the vehicle body 406. The second IMU 418 may be mounted on the vehicle body 402 to determine the missing rational angle (e.g., the roll of the vehicle body 402 in this example) that is not determined using the first GNSS sensor 412(A) and the second GNSS sensor 412(B). In some cases, the second IMU 418 may also include one or more accelerometers, one or more gyroscopes, one or more magnetometers, and/or one or more pressure sensors, among others sensors.

The first IMU 416 may be configured to send the pitch, roll, and yaw of the implement 404 or data associated with the pitch, roll, and yaw of the implement 404 to a position recognizing system mounted within an engine compartment, vehicle case, or cab compartment of the vehicle 402. Similarly, the second IMU 418 may be configured to send the roll angle of the vehicle body 406 to the position recognizing system. The position recognizing system may also receive global position data representative of the first GNSS sensor 412(A) and the second GNSS sensor 412(B) and calculate the pitch and yaw angles of the vehicle body 406 as well as the vehicle body POI global position using a location of the global position of a GNSS reference point (for instance, a position of the GNSS sensor 412(A), the second GNSS sensor 412(B), or a location between the two GNSS sensors 412(A) and (B)), the rotational angels of the vehicle body 306, the known or fixed geometric offset (measured in the (X, Y, Z) dimensions) between the GNSS reference point and the vehicle body POI.

Figure 5:
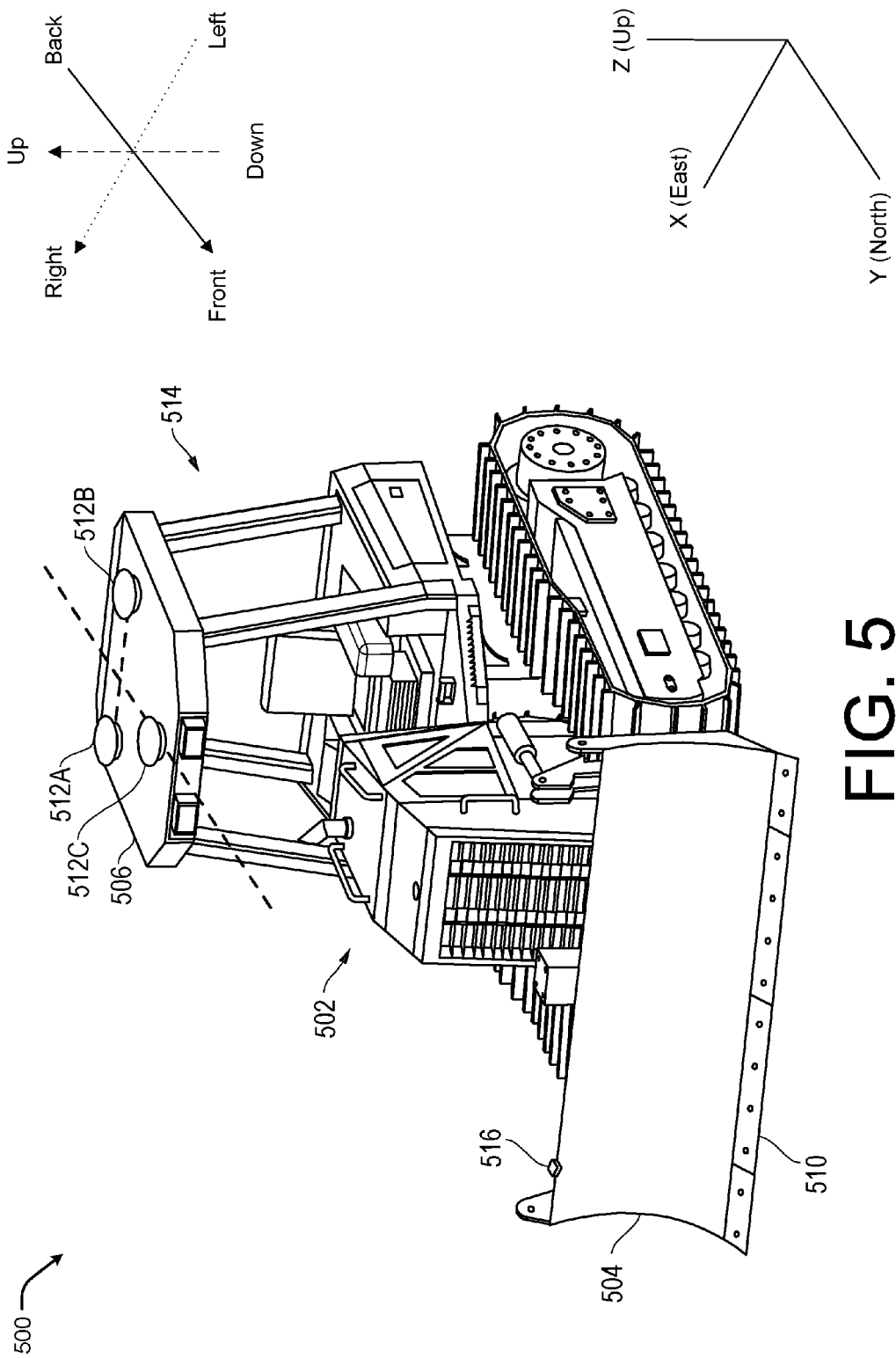
FIG. 5 is an orthogonal view of another sensor package system mounted on a vehicle including an implement without independent pitch control according to some implementations.

FIG. 5 is another orthogonal view of a sensor package system 500 mounted on a vehicle 502 including an implement 504 according to some implementations. In this example, the vehicle 502 does not include pitch cylinders for controlling the pitch of the implement 504 independent of the pitch of the lift frame 508. As in the examples above, the vehicle 502 is a bulldozer, but it should be understood that the sensor package system 500 may be applied to any vehicle including an implement 504.

The vehicle 502 includes the vehicle body 506 and the implement 504. The implement 504 is attached or connected to the vehicle body 506 via a lift frame (not shown). The implement 504 is, generally, disposed forwards of the vehicle body 506 and supported by the lift frame. The implement 504 includes a cutting edge 510 which contacts the ground during operations of the vehicle 502 including sloping, digging, leveling, grading, etc. The implement 504 is configured to be lifted up and down in conjunction with the motion of the lift frame.

The sensor package system 500 installed or mounted on the vehicle 502 may include a first GNSS sensor 512(A), a second GNSS sensor 512(B), and a third GNSS sensor 512(C). The first GNSS sensor 512(A), the second GNSS sensor 512(B), and the third GNSS sensor 512(C) may be disposed on the top of the vehicle body 506. In the illustrated example, the first GNSS sensor 512(A), the second GNSS sensor 512(B), and the third GNSS sensor 512(C) are disposed on top of a cab 514 associated with the vehicle body 506. Each of the first GNSS sensor 512(A), the second GNSS sensor 512(B), and the third GNSS sensor 512(C) may include one or more antennas for receiving satellite signals and one or more registered or other components for decoding the satellite signal and determining a global position associated with each of the first GNSS sensor 512(A), the second GNSS sensor 512(B), and the third GNSS sensor 512(C).

In the illustrated example, the first GNSS sensor 512(A) and the second GNSS sensor 512(B) are aligned a latitudinal axis of the vehicle body 506 and the third GNSS sensor 512(C) is aligned along the longitudinal axis of the vehicle body 506. The three GNSS sensors 512(A)-(C) may be utilized to determine positioning data and the rotational angles of the vehicle body 506. A known or fixed distance between the first GNSS sensor 512(A) and the second GNSS sensor 512(B), a known or fixed distance between the first GNSS sensor 512(A) and the third GNSS sensor 512(C), and a known or fixed distance between the second GNSS sensor 512(B) and the third GNSS sensor 512(C) may be measured during installation.

By utilizing three GNSS sensors 512(A), 512(B), and 512(C) with known or fixed distances between them, the system 500 may differentiate the three global position coordinates measured by the first GNSS sensor 512(A), the second GNSS sensor 512(B), and the third GNSS sensor 512(C) to determine the global positon of the vehicle body 506, in addition to the vehicle body pitch, roll, and yaw angles of the vehicle body 506. Thus, in the illustrated example, the IMU sensor on the vehicle body may be foregone and the pitch, roll, and yaw angles of the vehicle body 506 may be determined as a more accurate measurement. For example, over time, IMU sensors, such as magnetometers, may drift out of calibration which results in lower quality measurements and affects the overall precision with which the implement 504 may be controlled. Thus, by utilizing three GNSS sensors 512(A), 512(B), and 512(C) and by utilizing a single IMU, the sensor system 500 may no longer need to be calibrated or updated on a regular basis, thereby reducing overall cost of operating a vehicle utilizing the system 500.

However, the sensor package system 500 installed or mounted on the vehicle 502 may still include an IMU 516 disposed on the implement 504. As described above, the IMU 516 may include one or more accelerometers, one or more gyroscopes, one or more magnetometers, and/or one or more pressure sensors, among others sensors. In one particular example, the IMU 516 may include three accelerometers placed orthogonal to each other, three rate gyroscopes placed orthogonal to each other, three magnetometers placed orthogonal to each other, and a barometric pressure sensor. The placement of the IMU 516 on the implement 504 allows the IMU 516 to collect data related to the motion and angles (pitch, roll, and yaw) of the implement 504. The IMU 516 may be associated with an implement angle obtaining part (not shown) that may assist in calculating the pitch, roll and yaw angle of the implement 504.

The first IMU 516 and/or the implement angle obtaining part may be configured to send the pitch, roll, and yaw of the implement 504 to a position recognizing system (not shown) mounted within an engine compartment, vehicle case, or cab compartment of the vehicle 502. The position recognizing system may also receive global position data representative of the first GNSS sensor 512(A), the second GNSS sensor 512(B), and the third GNSS sensor 512(C) and calculate the pitch, roll, and yaw angles of the vehicle body 506 as well as the vehicle body POI global position using the global position of a GNSS reference point (such as a position of one of the GNSS sensor 512(A)-(C)), the rotational angles of the vehicle body 506, and the geometric offsets between the GNSS reference point and the vehicle body POI global position.

Figure 6:
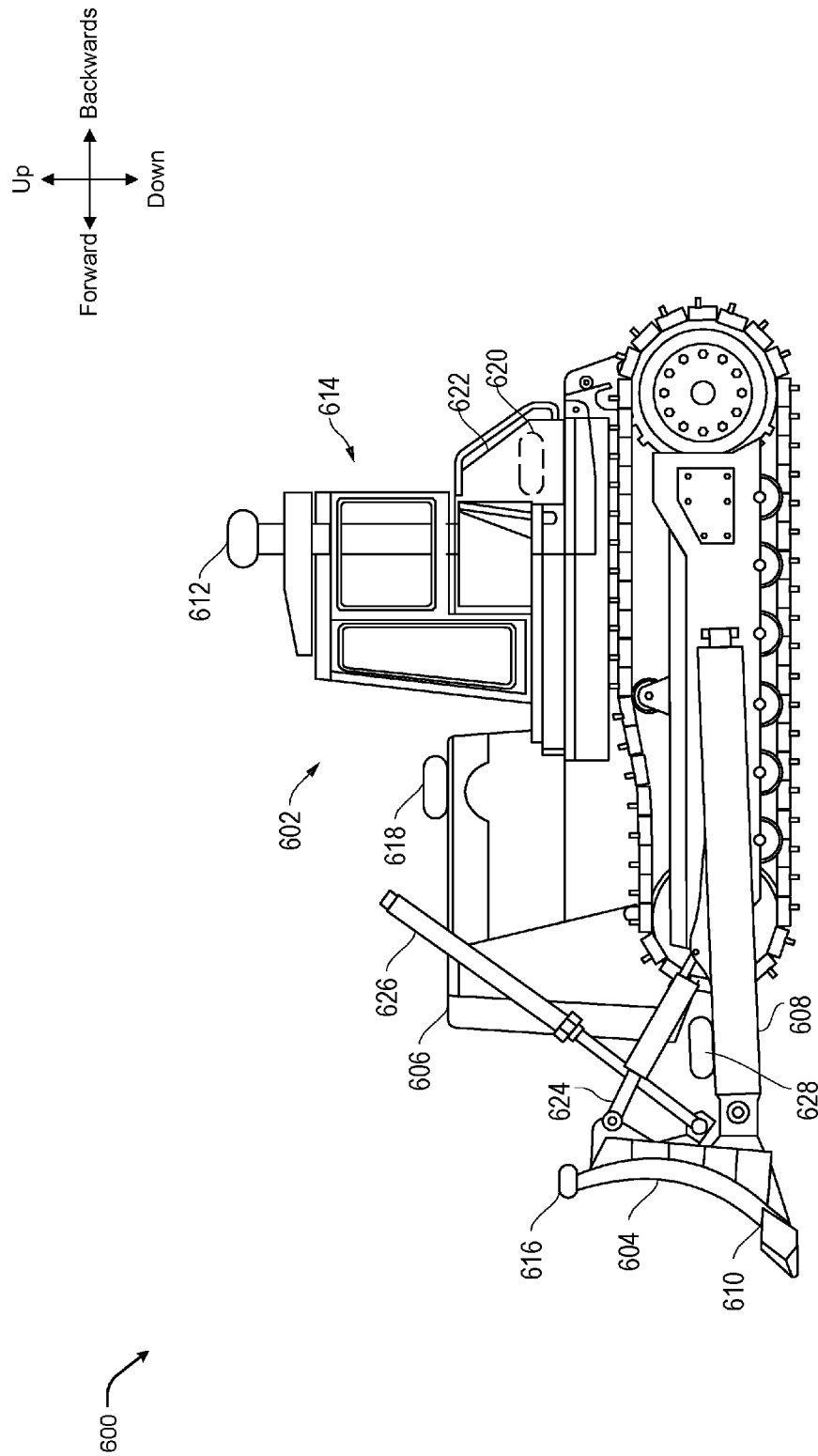
FIG. 6 is a side view of a sensor package system mounted on a vehicle including an implement having independent pitch control according to some implementations.

FIG. 6 is a side view of a sensor package system 600 mounted on a vehicle 602 including an implement 604 according to some implementations. In the illustrated example, the vehicle 602 includes the vehicle body 606 and the implement 604. The implement 604 is attached or connected to the vehicle body 606 via an implement support system. The implement 604 is, generally, disposed forwards of the vehicle body 606 and supported by the implement support system. The implement 604 includes a cutting edge 610 which contacts the ground during operations of the vehicle 602 including sloping, digging, leveling, grading, etc.

Unlike, the examples of FIGS. 1-5, in the current implementation, the implement support system includes pitch and tilt cylinders 624 for controlling the tilt and pitch of the implement 604 in addition to lift cylinders 626 for controlling lower and extending the implement 604. Thus, in this illustrated example, the implement 604 may pitch independent of a lift frame 608.

Similar to the system 100 of FIG. 1, the sensor package system 600 installed or mounted on the vehicle 602 may include a GNSS sensor 612. The GNSS sensor 612 may be disposed on the top of the vehicle body 606 (for example, on top of a cab 614 associated with the vehicle body 606). The GNSS sensor 612 may include one or more antennas for receiving satellite signals and one or more receivers or other components for decoding the satellite signal and determining a global position of the GNSS sensor 612. In some cases, the satellite signals received by the GNSS sensor 612 may be in various formats or standards, such as GPS, GLONASS, Galileo, BeiDou as well as other satellite navigation standards. The GNSS sensor 612 may have different arrangements on top of the vehicle body 606. For instance, the GNSS sensor 612 may be disposed on the center of the vehicle body 606.

The sensor package system 600 installed or mounted on the vehicle 602 may also include a first IMU 616 disposed on the implement 604. The first IMU 616 may include one or more accelerometers, one or more gyroscopes, one or more magnetometers, and/or one or more pressure sensors, among others sensors. In one particular example, the first IMU 616 may include three accelerometers placed orthogonal to each other, three rate gyroscopes placed orthogonal to each other, three magnetometers placed orthogonal to each other, and a barometric pressure sensor. The placement of the first IMU 616 on the implement 604 allows the first IMU 616 to collect data related to the motion and angles of the implement 604.

The sensor package system 600 installed or mounted on the vehicle 602 may also include a second IMU 618 disposed on the vehicle body 606. The second IMU 618 may be mounted on the vehicle body 602 to determine the pitch, roll, and yaw angles of the vehicle body 602 independent of the implement 604 pitch, roll, and yaw angles. In some cases, the second IMU 618 may also include one or more accelerometers, one or more gyroscopes, one or more magnetometers, and/or one or more pressure sensors, among others sensors. The placement of the second IMU 618 on the vehicle body 606 allows the second IMU 618 to collect data related to the motion and angles (pitch, roll, and yaw) of the vehicle body 606. The second IMU 618 may be associated with a vehicle body angle part to assist in calculating the pitch, roll, and yaw angle measurements of the vehicle body 606.

In this example, the pitch, roll, and yaw of the implement 604 is known via the first IMU 616. Similarly, the pitch, roll, and yaw of the vehicle body 606 is known via the second IMU 618. The global position of the vehicle body 606 is also known via the GNSS sensor 612. Since the implement 604 may pitch independent of the lift frame 608, a difference between the pitch angle of the implement 604 and the pitch of the vehicle body 606 may vary during use. Thus, the system 600 includes a third IMU sensor 628 positioned or mounted on the lift frame 608 to assist in determining the pitch angle of the of the lift frame 608. In some cases, the third IMU 628 may be a gyroscope. In other cases, the third IMU 628 may include additional gyroscopes, accelerometers, magnetometers, and/or pressure sensors to determine data associated with the yaw and roll angles of the lift frame 608 independent of the vehicle body roll and yaw angles.

Figure 8:
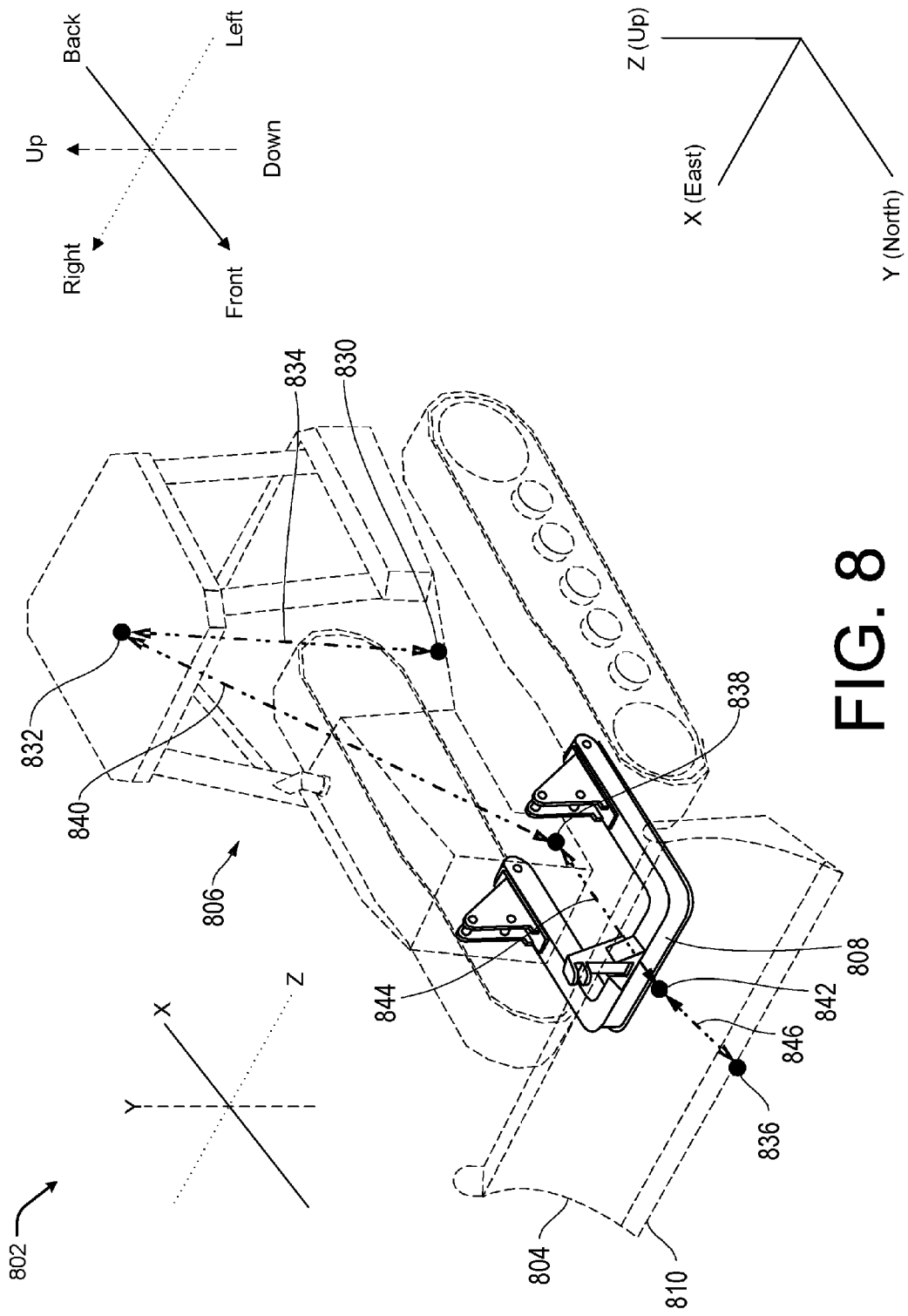
FIG. 8 is an orthogonal view of a vehicle to illustrate vehicle body reference points that may be utilized for calculating the points of interest and angles, positions, and slopes for controlling the vehicle during operation according to some implementations.

Thus, a position recognizing system may be configured to calculate a global position of a vehicle body POI (not shown) and ultimately a implement POI (not shown) based on pitch, roll, and yaw of the implement 604, the pitch, roll, and yaw of the vehicle body 606, the pitch, roll, and yaw of the lift frame 608, the global position of the GNSS sensor 612, and various geometric relations or offsets associated with the vehicle body 606, the lift frame 608, and implement 604, described in more detail below with respect to FIG. 8.

In the current example a GNSS sensor 612, a first IMU sensor 616 on the vehicle body 606, and a second IMU 618 sensor on the implement 604 in addition to the third IMU sensor 628 on the lift frame 608. However, in other examples, the third IMU sensor 628 may be utilized in combination with the systems 100-500 described above with respect to FIGS. 1-5. Thus, in another example in which the implement 604 may pitch independent of the lift frame 608, the system may include one or more GNSS sensors, an IMU sensor on the vehicle body, an IMU sensor on the implement, and an IMU sensor on the lift frame.

Figure 7:
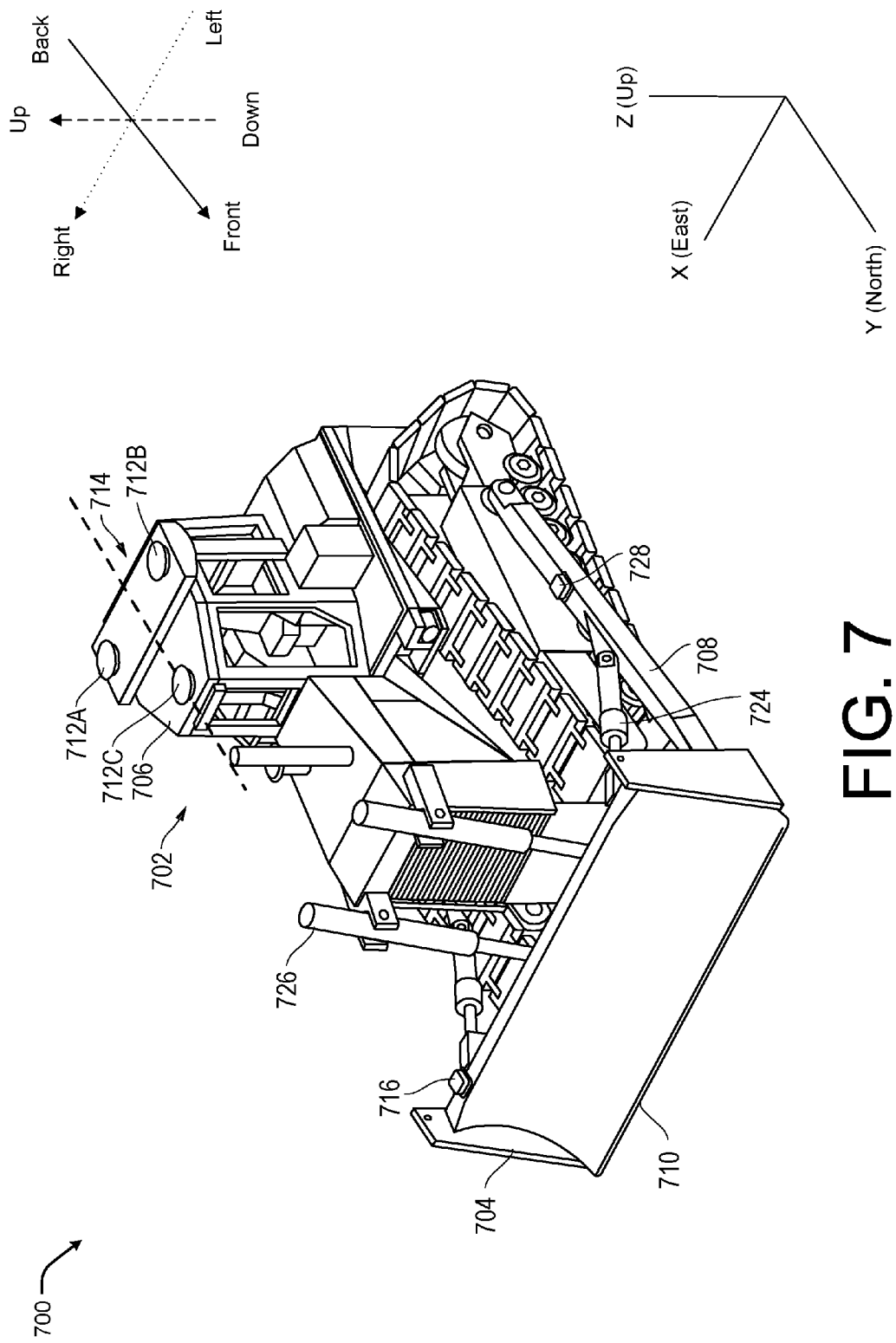
FIG. 7 is an orthogonal view of another sensor package system mounted on a vehicle including an implement having independent pitch control according to some implementations.

FIG. 7 illustrates yet another sensor package system 700 mounted on a vehicle 702 including an implement 704 in which the implement may pitch independent of the lift frame 708. In this example, the implement 704 includes a cutting edge 710 and is attached or connected to the vehicle body 706 via an implement support system. The implement support system includes a lift frame 708 for raising and lowering the implement 704, pitch and tilt cylinders 724 for controlling the pitch and tilt of the implement 704, and lift cylinders 726 for extending implement 704. Thus, similar to the example system 600 above, the implement 704 may pitch independent of the lift frame 708.

In the illustrated example, the sensor package system 700 installed or mounted on the vehicle 702 may include a first GNSS sensor 712(A), a second GNSS sensor 712(B), and a third GNSS sensor 712(C). The first GNSS sensor 712(A), the second GNSS sensor 712(B), and the third GNSS sensor 712(C) may be disposed on the top of a cab 714 associated with the vehicle body 706. In the current example, the first GNSS sensor 712(A) and the second GNSS sensor 712(B) are aligned along a latitudinal axis of the vehicle body 706 and the third GNSS sensor 712(C) is aligned along a longitudinal axis of the vehicle body 706 to provide positioning data and in some cases, the roll angle, yaw angle, and/or pitch angle of the vehicle body 706. A known or fixed distance between the first GNSS sensor 712(A) and the second GNSS sensor 712(B), the first GNSS sensor 712(A) and the third GNSS sensor 712(C), and the second GNSS sensor 712(B) and the third GNSS sensor 712(C) may be measured during installation.

By utilizing three GNSS sensors 712(A), 712(B), and 712(C) with known or fixed distances between them, the system 700 may differentiate the three global position coordinates measured by the first GNSS sensor 712(A), the second GNSS sensor 712(B), and the third GNSS sensor 712(C) to determine the pitch, roll, and yaw angles of the vehicle body 706. Thus, in the illustrated example, the second IMU sensor 618 of FIG. 6 on the vehicle body 706 may be foregone and the pitch, roll, and yaw angles of the vehicle body 706 may be determined more accurately. For example, over time IMU sensors, such as magnetometers, may drift out of calibration which results in lower quality and affects the overall precision with which the implement 704 may be controlled. Thus, by utilizing three GNSS sensors 712(A), 712(B), and 712(C) the sensor system 700 may no longer need to be calibrated or updated on a regular basis, thereby reducing an overall cost of operating a vehicle utilizing the system 700.

Unlike the second IMU sensor 618 of FIG. 6, the sensor package system 700 installed or mounted on the vehicle 702 does include a first IMU 716 disposed on the implement 704. The first IMU 716 may include one or more accelerometers, one or more gyroscopes, one or more magnetometers, and/or one or more pressure sensors, among others sensors. The placement of the first IMU 716 on the implement 704 allows the first IMU 716 to collect data related to the motion and angles of the implement 704.

In this example, the pitch, roll, and yaw of the implement 704 is known via the first IMU 716 and/or the blade angle obtaining part. Similarly, the pitch, roll, and yaw of the vehicle body 706 may be calculated using the data received by the three GNSS sensors 712(A), 712(B), and 712(C) and the position of the vehicle body may be determined using one or more of the GNSS sensors 712(A)-(C). Since the implement 704 may pitch independent of the lift frame 708, a difference between the pitch angle of the implement 704 and the pitch of the lift frame 708 may vary during use. Thus, the system 700 includes a second IMU sensor 728 positioned or mounted on the lift frame 708 to assist in determining the pitch angle of the of the lift frame 708. The position of the implement POI may be determined using the rotational angles of the lift frame 708, the rotational angles of the implement 704, the rotational angles of the vehicle body, and the position of one or more reference points on the vehicle body 706 and/or the lift frame 708, and known geometric offsets between the reference points and the implement POI.

FIG. 8 is an orthogonal view of a vehicle 802 to illustrate vehicle body reference points that may be utilized for calculating the points of interest and angles, position, and slopes for controlling the vehicle 802 during operation according to some implementations. In some cases, to accurately control the vehicle 802 and a implement 804 during operations such as sloping, digging, leveling, grading, etc., an east, north, up (ENU) coordinates of the vehicle body POI 830 (or a gradational center of the vehicle body) and the rotational angels (pitch, roll, and yaw) of the vehicle body POI 830 are determined based on the data collected by at least one of the sensor systems 100-700 of FIGS. 1-7 (not shown) installed on the vehicle 802.

Unlike the global longitude, latitude, and altitude (LLA) coordinates received and determined by the GNSS sensors, the ENU coordinates are local coordinates that may be utilized to control the operations of the vehicle 802. For example, the ENU frame may be used as a position reference in an X-Y plane that is tangential to ellipsoid surface of the Earth as determined by the World Geodetic System 1984 (WGS-84). The conversion from LLA coordinates to ENU coordinates is described in more detail below with respect to FIG. 10.

To determine ENU coordinates and angles of the vehicle body POI 830, a position recognizing system (not shown) may receive vehicle body rotational angles (pitch, roll, and yaw) of the vehicle body 806 and the LLA coordinates of the GNSS reference point 832. For instance, as described above, the vehicle body rotational angles may be received from one or more IMUs on the vehicle body 806, a combination of IMUs and GNSS sensors on the vehicle body, or from multiple GNSS sensors. Likewise, as described above, the LLA coordinates of the GNSS reference point 832 may be received from one or more GNSS sensors. For example, the GNSS reference point 832 may be a center of one of the GNSS sensors or a point between the GNSS sensors.

Once the vehicle body rotational angles (pitch, roll, and yaw) and the LLA coordinates of the GNSS reference point 832 are received at the position recognizing system, the position recognizing system may assign the vehicle body rotational angles as the rotational angles of the vehicle body POI as the vehicle body POI and the IMU sensors may be mounted within the same frame (e.g., the location of the IMU rotates with respect to pitch, roll, and yaw together with the location of the vehicle body POI). The position recognizing system may also convert the LLA coordinates of the GNSS reference point 832 to ENU coordinates of the GNSS reference point 832. The position recognizing system may apply a first coordinate inference model using the ENU coordinates of the GNSS reference point 832 and a first known geometric offset 834 (e.g., one or more first distances measured during installation) to calculate the ENU coordinates of the vehicle body POI 830. In some cases, the geometric offset may be measured in a three dimensional space (e.g., in an X, Y, Z coordinate system).

In some cases, the geometric offsets may be calculated in three dimensional space. For instance, in the current example, the GNSS reference point 832 and the vehicle body POI 830 are within the same plane (e.g., along the vehicle center line). However, in other examples, the GNSS reference point 832 and/or the vehicle body POI 830 may be offset from the center line. Thus, the geometric offsets may be represented using X, Y, and Z dimensions, as illustrated.

Additionally, the ENU coordinates of the implement POI 836 and the rotational angels (pitch, roll, and yaw) of the implement POI 836 are determined based on the data collected by at least one of the sensor systems 100-700 of FIGS. 1-7 (not shown) installed on the vehicle 802 to accurately control the vehicle 802 and the implement 804 during operations such as sloping, digging, leveling, grading, etc. To determine an ENU coordinates and angles of the implement POI, a position recognizing system may assign the pitch, roll, and yaw angles determined via the IMU sensor (not shown) located on the implement 804 as described above with respect to FIGS. 1-7. The position recognizing system may also determine the ENU coordinates of the implement POI 836 using various reference points associated with the vehicle 802.

For example, the position recognizing system may first determine the ENU coordinates of a lift frame origin point (LFOP) 838 associated with the lift frame 808. As illustrated, the LFOP 838 may be located at a central position between the two location at which the lift frame 808 attaches to the vehicle body 806. The position recognizing system may determine the ENU coordinates of the LFOP 838 by applying a second coordinate inference model to the ENU coordinates of the GNSS reference point 832, and a second known geometric offset 840 (e.g., one or more second distances measured during installation). The position recognizing system may assign the vehicle body rotational angles to the LFOP 838 as the LFOP 838 and the vehicle body 806 are not configured to rotate in any dimension independently of each other. In some cases, the first and second coordinate inference models may be different and in some cases, the first and second coordinate inference models may be the same model.

The position recognizing system may next determine the ENU coordinates and angels of an implement origin point (TOP) 842 associated with a location at which the implement 804 attaches to the lift frame 808. The position recognizing system may assign the rotational angles of the IOP 842 based on the angles determined using an IMU associated with the lift frame 808. In other examples, the rotational angles may be assigned using the data collected by an IMU mounted on the vehicle body and an IMU mounted on the implement, such as when the implement 804 does not pitch independently of the lift frame 808. In another example, the roll and yaw angles may be assigned using the vehicle body rotational angles and the pitch angle may be obtained using a gyroscope mounted on the lift frame 808.

The position recognizing system may also determine the ENU coordinates of the IOP 842 by applying a third coordinate inference model to the ENU coordinates of the LFOP 838, the lift frame 808 rotational angles, and a third known geometric offset 844 (e.g., a third distance measured during installation). In some cases, third coordinate inference model may differ from the first and/or second coordinate inference models, while in other cases, the third coordinate inference model may be the same as the first and/or second coordinate inference models.

The position recognizing system may next determine the ENU coordinates and angels of an implement POI 836. The position recognizing system may determine the ENU coordinates of the implement POI 836 by applying a fourth coordinate inference model to the ENU coordinates of the IOP 842, and a fourth known geometric offset 846 (e.g., one or more fourth distances measured during installation). The position recognizing system may also assign the implement rotation angles based on data measured by the IMU mounted on the implement as described with respect to FIGS. 1-7.

In some cases, a fourth coordinate inference model may differ from the first and/or second coordinate inference models, while in other cases, the third coordinate inference model may be the same as the first and/or second coordinate inference models. The implement POI 836 is illustrated as a central position along the bottom of the implement 804 to reduce the number of calculations during application of the fourth coordinate inference model. However, the implement POI 836 may be positioned at any point along the bottom of the implement 804 which contacts the ground, such as at either bottom corner.

Once the position recognizing system determines the vehicle body POI 832 and the implement POI 836 using the ENU coordinates, the position recognizing system may send the ENU coordinates of the vehicle body POI 832 and the ENU coordinates of the implement POI 836 to a remote system via a wireless communication channel, such that an administrator or system control may develop a navigational path or route for the vehicle 802 over surveyed terrain using an administrator system or remote control device. In other cases, the position recognizing system may alter a trajectory or movement of the vehicle 802 based at least in part on the ENU coordinates of the vehicle body POI 832, the ENU coordinates of the implement POI 836, and a preprogrammed navigation path or plan. In some instances, the navigation path includes instructions for the movement of the vehicle 802 as well as the implement 804.

FIGS. 9-12 are flow diagrams illustrating example processes associated with determining an elevation and slope angles for an implement of a vehicle or machine according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 9:
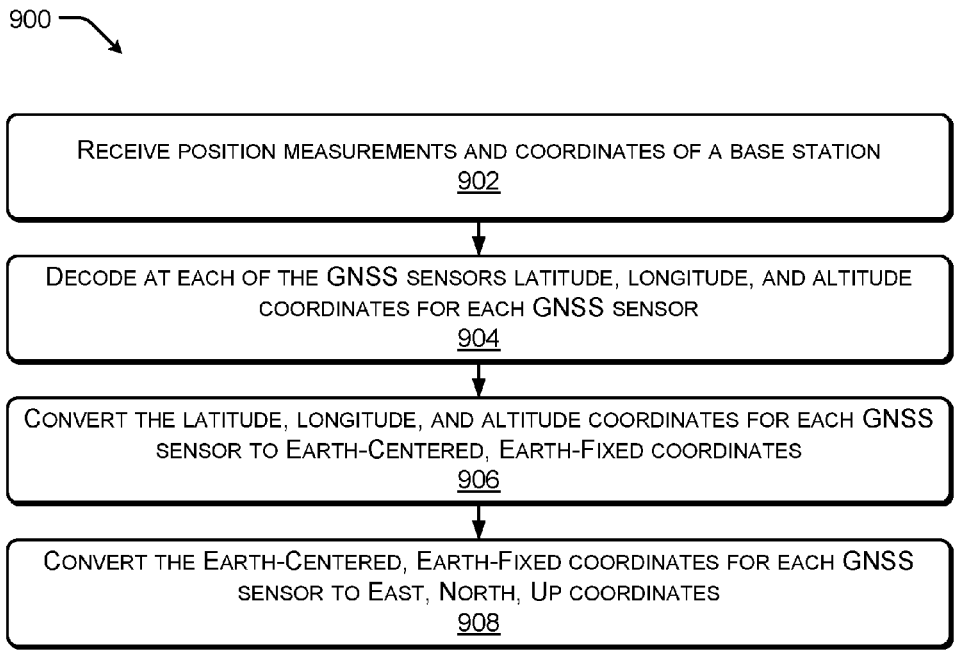
FIG. 9 is an example flow diagram showing an illustrative process for converting longitude, latitude, altitude coordinates into east, north, up coordinates according to some implementations.

FIG. 9 is example flow diagram showing an illustrative process 900 for converting longitude, latitude, altitude coordinates into east, north, up coordinates according to some implementations. As discussed above, to accurately control a vehicle and an implement during operations such as sloping, digging, leveling, grading, etc., east, north, up (ENU) coordinates of the vehicle body POI and the implement POI are utilized. For instance, the ENU frame may be used as a position reference in an X-Y plane that is tangential to a surface of the Earth.

At 902, the GNSS sensors or a position recognizing system may receive LLA coordinates of a GNSS base station. For example, the LLA coordinates of the GNSS base station may be received via a wireless communication interface. For instance, the GNSS base station LLA coordinates may be received via an RF, cellular, microwave, satellite, Bluetooth, and/or other type of wireless signal.

At 904, each of the GNSS sensors decodes a satellite signal (or multiple satellite signals) and determines based on the decoded signal the LLA coordinates of the GNSS sensor. In one example, the GNSS sensors first enter an acquisition phase to sample and decode the satellite signal from each visible GNSS satellite. The satellite signals include a time stamp and ephemeris data (data related to the location and trajectory of the transmitting satellite). Second, the GNSS sensors perform a series of calculations based on the time stamp and ephemeris data to determine an initial LLA coordinates.

At 906, the GNSS sensors or a position recognizing system converts the LLA coordinates for each GNSS sensor to an Earth-Centered, Earth-Fixed (ECEF) coordinate system. The ECEF coordinate system is a geographic coordinate system that is based on a Cartesian system represented by positions on an X, Y, and Z axis. In the ECEF coordinate system the 0, 0, 0 position is defined as the center of mass of the Earth.

At 908, the GNSS sensors or a position recognizing system converts the ECEF coordinates for each GNSS sensor to ENU coordinates. The ENU coordinates are based on an X-Y plane that is tangential to a surface of the Earth and is useful for remote control or programmed control/ movement of a vehicle on the surface of the Earth with reference to a fixed or known location (such as the GNSS base station). A LLA coordinate of a GNSS base station may also be converted into ECEF coordinates and/or ENU coordinate and used by the position recognizing system or the GNS sensors together with an offset between a GNSS base station and the vehicle to determine the ECU coordinates of the vehicle. Thus, in some instances, the ENU coordinate system may be utilized as a local reference frame in which an origin point is located at the position of the base station.

Figure 10:
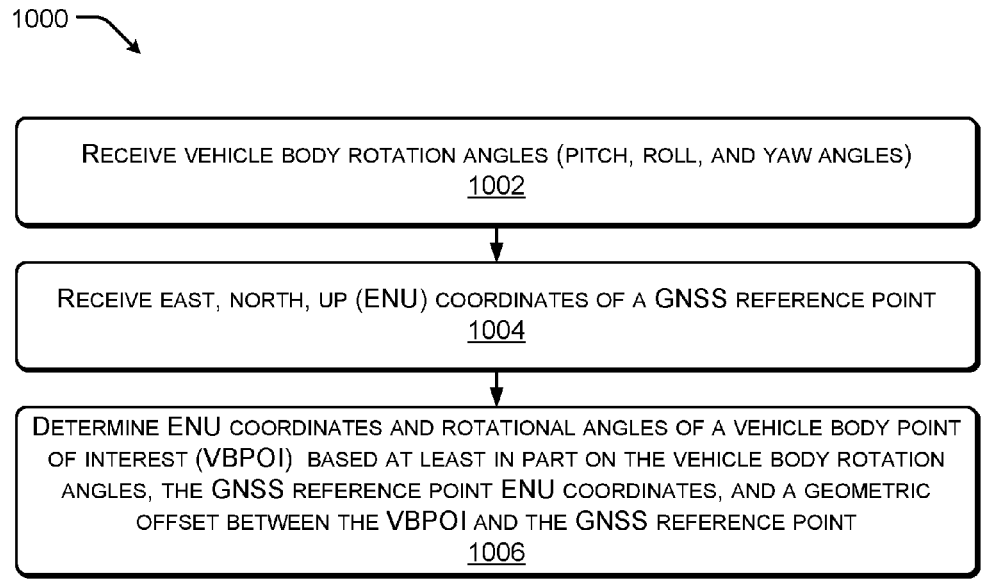
FIG. 10 is an example flow diagram showing an illustrative process for determining coordinates of a vehicle point of interest according to some implementations.

FIG. 9 illustrates one process 900 for converting LLA coordinates determined by one or more GNSS sensors to ENU coordinates. FIG. 10 illustrates a process for converting the GNSS sensor ENU coordinates into ENU coordinates for a vehicle body POI which may be used to represent the actual position of the vehicle in the ENU coordinate system.

FIG. 10 is example flow diagram showing an illustrative process 1000 for determining coordinates of a vehicle point of interest according to some implementations. For instance, to accurately control a vehicle remotely to perform operations such as grading, leveling, removing, sloping, and other operations associated with moving terrain, a vehicle body point of interest and an implement point of interest are tracked.

At 1002, a position recognizing system receives vehicle body rotation angles (pitch, roll, and yaw) of the vehicle body. For example, an IMU mounted on the body of the vehicle (as described above with respect to FIGS. 1 and 2) may provide data usable by the position recognizing system to determine the pitch, roll, and yaw angles associated with the vehicle body. In another example, an IMU mounted on the body of the vehicle in conjunction with two or more GNSS sensors mounted on the body of the vehicle may provide the data usable by the position recognizing system to determine the pitch, roll, and yaw angles. In yet another example, three or more GNSS sensors mounted on the body of the vehicle may provide the data usable by the position recognizing system to determine the pitch, roll, and yaw angles.

At 1004, the position recognizing system may receive ENU coordinates of a GNSS reference point. In some cases, the position recognizing system may receive LLA coordinates associated with one or more GNSS sensor and covert the LLA coordinates into ENU coordinates. The position recognizing system may also determine the ENU coordinates of a GNSS reference point based at least in part on the ENU coordinates of the GNSS sensors. For example, the system may include a single GNSS sensor. In this example, the LLA coordinates of the GNSS sensor may also be the ENU coordinates of the GNSS reference point (e.g., the GNSS sensor is the reference point). In other examples, the GNSS reference point may be a location between the one or more GNSS sensors and may be determined based at least in part on the ENU coordinates of each of the GNSS sensors and one or more known distances.

At 1006, the position recognizing system determines ENU coordinates and rotational angles of a vehicle body POI based at least in part on the vehicle body rotational angles, the ENU coordinates of the GNSS reference point, and a geometric offset between the vehicle body POI and the GNSS reference point, as described above. For example, the vehicle body POI may be a projection point of the vehicle gravitational center along the vehicle's bottom plane. Thus, the elevation and angles of vehicle body POI may be an accurate reflection of the vehicle's position (or ENU coordinates) on the ground and may be used for real-time terrain elevation survey and vehicle navigation precise control.

Figure 11:
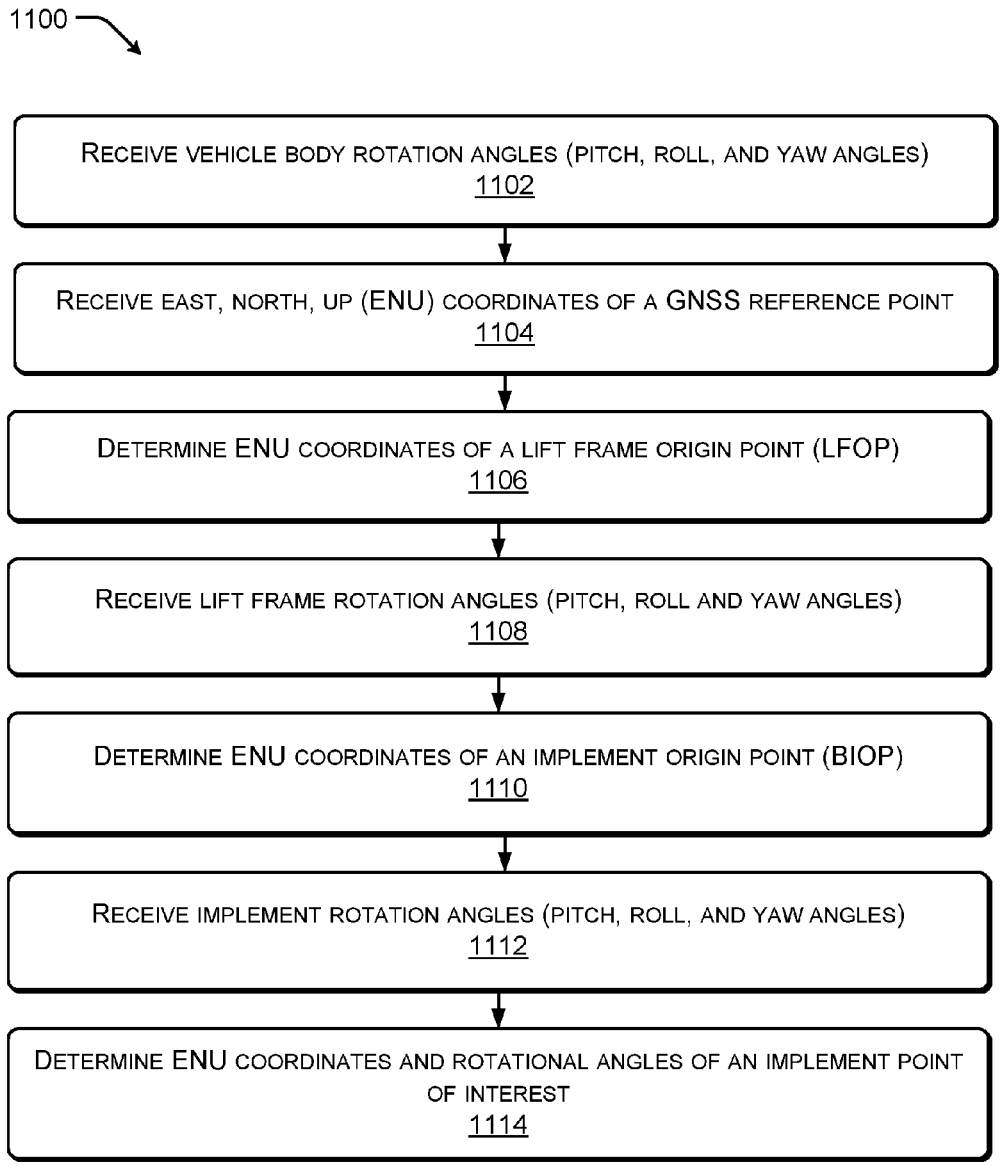
FIG. 11 is an example flow diagram showing an illustrative process for determining coordinates of an implement point of interest according to some implementations.

FIG. 11 is an example flow diagram showing an illustrative process 1100 for determining coordinates of an implement point of interest according to some implementations. For instance, in addition to the ENU coordinates and angels of the vehicle body POI, the implement point of interest should be determined to remotely control the vehicle during various operations.

At 1102, a position recognizing system receives vehicle body rotation angles (pitch, roll, and yaw) of the vehicle body. For example, an IMU mounted on the body of the vehicle (as described above with respect to FIGS. 1 and 2) may provide data usable by the position recognizing system to determine the pitch, roll, and yaw angles associated with the vehicle body. In another example, an IMU mounted on the body of the vehicle in conjunction with two or more GNSS sensors mounted on the body of the vehicle may provide the data usable by the position recognizing system to determine the pitch, roll, and yaw angles. In yet another example, three or more GNSS sensors mounted on the body of the vehicle may provide the data usable by the position recognizing system to determine the pitch, roll, and yaw angles.

At 1104, the position recognizing system may receive ENU coordinates of a GNSS reference point. In some cases, the position recognizing system may receive LLA coordinates associated with one or more GNSS sensors and convert the LLA coordinates into ENU coordinates. The position recognizing system may also determine the ENU coordinates of a GNSS reference point based at least in part on the ENU coordinates of the GNSS sensors. For example, the system may include a single GNSS sensor. In this example, the LLA coordinates of the GNSS sensor may also be the ENU coordinates of the GNSS reference point (e.g., the GNSS sensor is the reference point). In other examples, the GNSS reference point may be a location between the one or more GNSS sensors and may be determined based at least in part on the ENU coordinates of each of the GNSS sensors and one or more known distances.

At 1106, the position recognizing system determines ENU coordinates of a LFOP based at least in part on the ENU coordinates of the GNSS reference point and at least one geometric offset between the lift frame origin point and the GNSS reference point. For example, the LFOP may be located at a central position between the two fixed location at which the lift frame attaches to the vehicle body. The position recognizing system may determine the ENU coordinates of the LFOP by applying a coordinate inference model to the ENU coordinates of the GNSS reference point and known geometric offsets or a distance between the GNSS reference point and the LFOP.

At 1108, the position recognizing system may receive rotational angles of a lift frame supporting the implement. For example, a gyroscope mounted on the lift frame may provide data usable by the position recognizing system for determining the pitch angle of the lift frame. In another example, an IMU may be mounted on the lift frame in lieu of the gyroscope to provide all three rotational angles of the lift frame (e.g., the pitch, roll, and yaw angles).

At 1110, the position recognizing system determines ENU coordinates of an TOP based at least in part on the ENU coordinates of the LFOP, at least one geometric offset between the LFOP and the IOP, and the pitch, roll, and yaw angles of the lift frame. For example, the IOP may be at a location that the implement attaches to the lift frame. The position recognizing system may determine the ENU coordinates of the IOP by applying a coordinate inference model the ENU coordinates of the LFOP, a geometric offset between the LFOP and the BIOP, and the pitch, roll, and yaw angles.

At 1112, the position recognizing system may receive rotation angles (pitch, roll, and yaw) of the implement. For example, an IMU may be mounted on the implement to obtain data usable by the position recognizing system for determining the rotation angles of the implement.

At 1114, the position recognizing system determines ENU coordinates of implement POI based at least in part on the ENU coordinates of the IOP and at least one geometric offset between the implement POI and the IOP. The implement POI may be a central position along the bottom of the implement, as described above with respect to FIG. 8. Alternatively, the implement POI may be any position at any point along the bottom of the implement, such as at either bottom corner.

Figure 12:
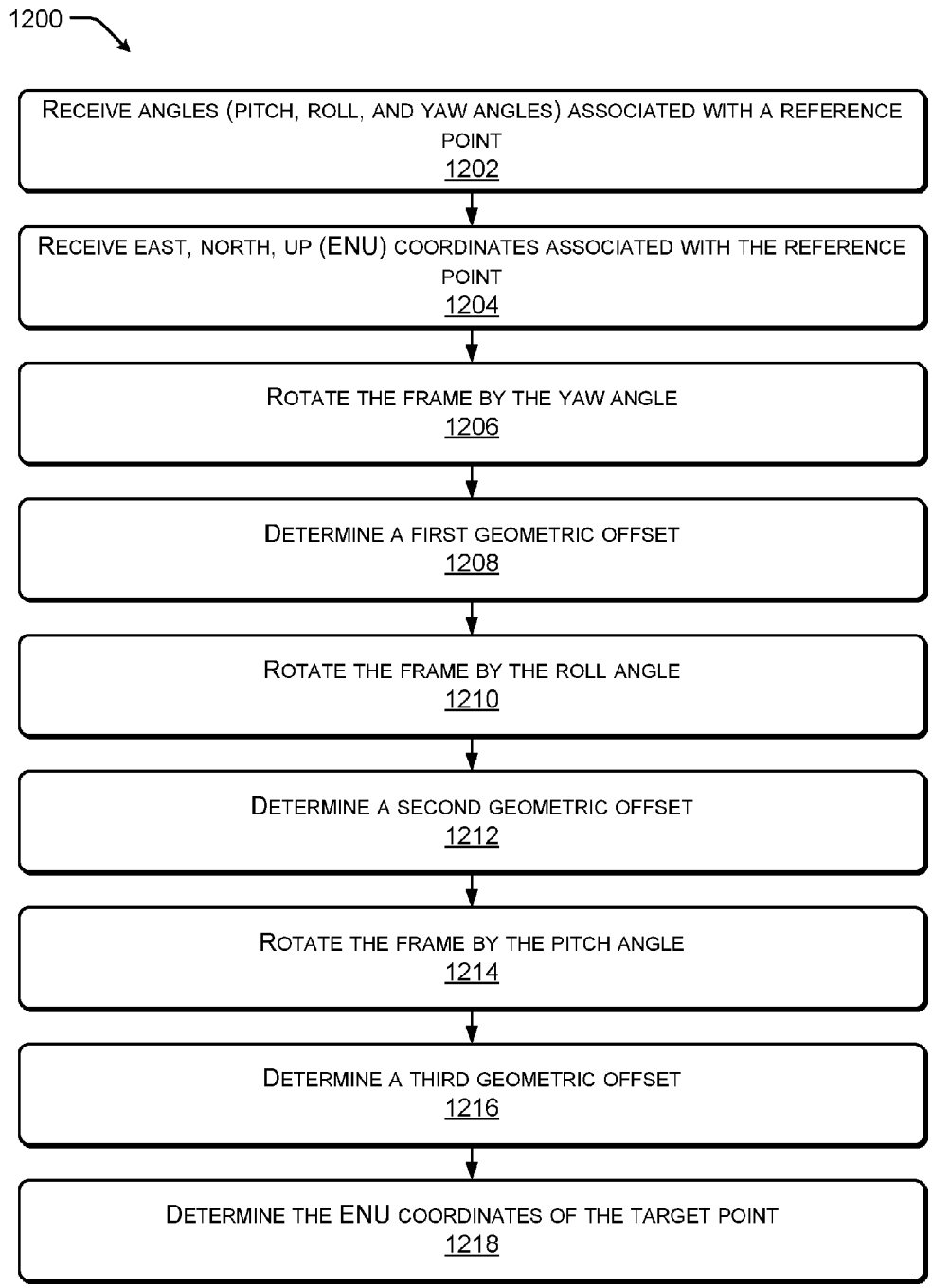
FIG. 12 is an example flow diagram showing an illustrative process for determining coordinates of a target point using coordinates of a reference point according to some implementations.

FIG. 12 is example flow diagram showing an illustrative process 1200 for determining coordinates of a target point using coordinate of a reference point according to some implementations. As discussed above, the position recognizing system determines the coordinates of a reference point via one or more coordinate inference models to determine the ENU coordinates of the vehicle body POI and the ENU coordinates of the implement POI. In one particular example, the position recognizing system may determine the coordinates of a target point using a second reference point.

At 1202, a position recognizing system receives rotation angles (pitch, roll, and yaw) associated with the reference point. For example, an IMU, a combination of an IMU and two or more GNSS sensors, or three or more GNSS sensors may provide data usable by the position recognizing system to determine the pitch, roll, and yaw angles. In yet another example, the rotational angles may have been determined, identified, or assigned during a previous conversion from another reference point to the current reference point. In one particular example, the pitch, roll and yaw angles of the current frame (such as the vehicle body, lift frame, or implement) may be represented by ($\theta_p$, $\theta_r$, $\theta_y$).

At 1204, the position recognizing system may receive ENU coordinates of the reference point. In some cases, the position recognizing system may receive LLA coordinates associated with one or more GNSS sensors and covert the LLA coordinates into ENU coordinates. The position recognizing system may also determine the ENU coordinates of a GNSS reference point based at least in part on the ENU coordinates of the GNSS sensors or another reference point. For instance, in one particular example, the ENU coordinate may be represented by ($X_r$, $Y_r$, $Z_r$). As discussed above, the each geometric offset may include three offsets, one in each of the X, Y, and Z directions. For instance, the original geometric offsets between the first reference point and the second reference point may be ($d_x$, $d_y$, $d_z$).

At 1206, the position recognizing system may rotate the frame by the yaw angle ($\theta_y$). And at 1208, the position recognizing system determines a first geometric offset. For instance, an original or measured distance between the reference point and the target point may be represented by distances ($d_x$, $d_y$, $d_z$). In the current example, the first geometric offset represented by ($X_{ay}$, $Y_{ay}$, $Z_{ay}$) may be determined.

At 1210, the position recognizing system may rotate the frame by the roll angle ($\theta_r$). And at 1212, the position recognizing system determines a second geometric offset represented by ($X_{ar}$, $Y_{ar}$, $Z_{ar}$) based at least in part on first geometric offset.

At 1214, the position recognizing system may rotate the frame by the pitch angle ($\theta_p$). And at 1216, the position recognizing system determines a third geometric offset represented by ($X_{ap}$, $Y_{ap}$, $Z_{ap}$) may be determined based at least in part on the second geometric offset.

At 1218, the position recognizing system may determine the ENU coordinates of the target point represented by ($X_t$, $Y_t$, $Z_t$) using the reference point position ($X_r$, $Y_r$, $Z_r$), and the third geometric offset determined above.

Figure 13:
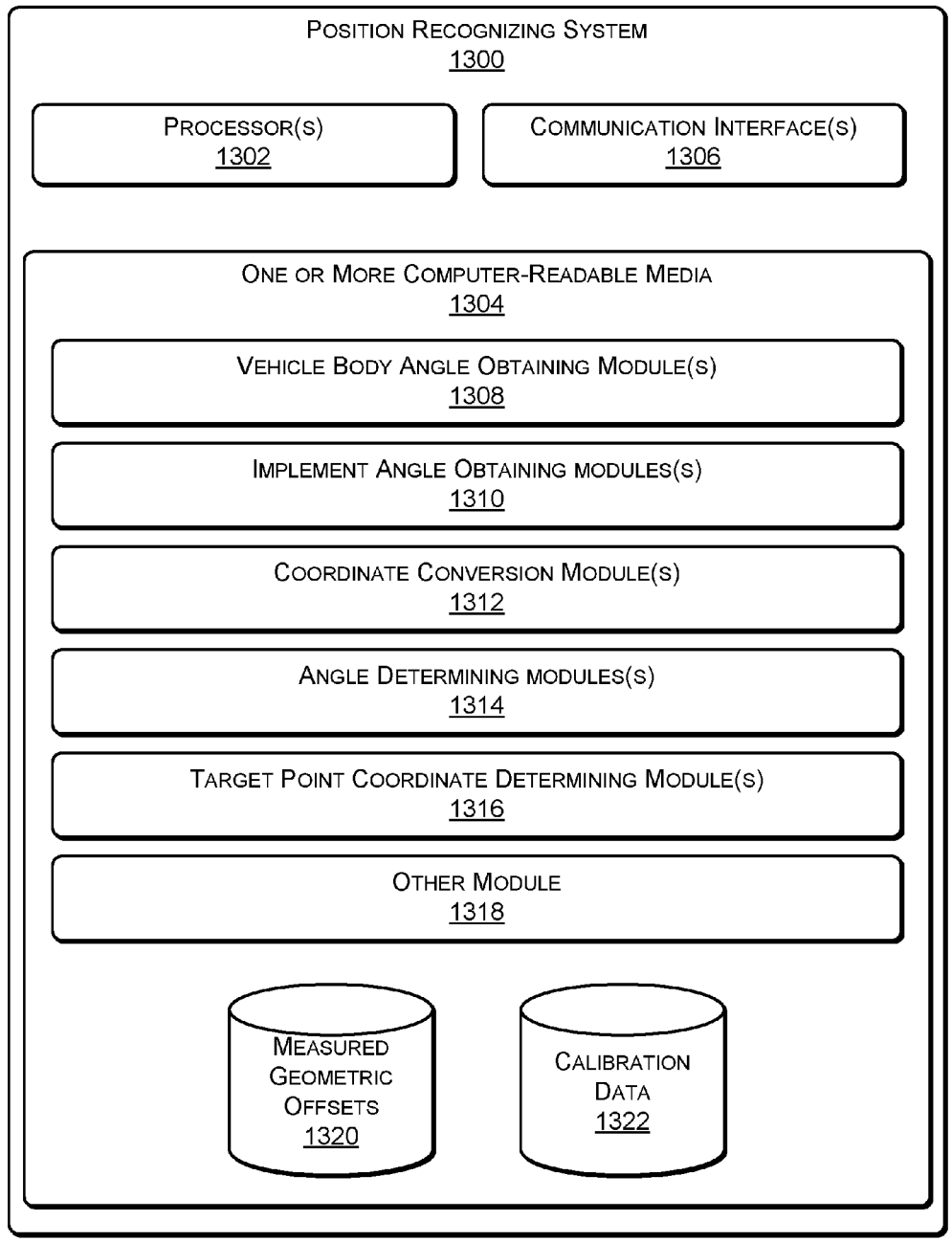
FIG. 13 illustrates example components of one or more servers associated with a position recognizing system according to some implementations.

FIG. 13 illustrates example components of one or more servers associated with the position recognizing system 1300 according to some implementations. The position recognizing system 1300 may include processing resources, as represented by processors 1302, and computer-readable storage media 1304. The computer-readable storage media 1304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The position recognizing system 1300 may also include one or more communication interfaces 1306, which may support both wired and wireless connection to various networks, such as cellular networks, radio (e.g., radio-frequency identification RFID), WiFi networks, short-range or near-field networks (e.g., Bluetooth®), infrared signals, local area networks, wide area networks, the Internet, and so forth. For example, the communication interfaces 1306 may allow the position recognizing system 1300 to receive data associated with rotation angles from various IMUs mounted on the vehicle, data associated with a satellite system from various GNSS sensors mounted on the vehicle or from a base station, or commands for controlling the vehicle from a control unit or remote control system. The communication interfaces 1306 may also allow the position recognizing system 1300 to send data associated with the vehicle body POI and the implement POI to the control unit or remote control system.

Several modules such as instruction, data stores, and so forth may be stored within the computer-readable media 1304 and configured to execute on the processors 1302. For example, a vehicle body angle obtaining module 1308, an implement angle obtaining module 1310, a coordinate conversation module 1312, an angle determining module 1314, a target point coordinate determining module 1316, as well as other modules 1318. In some implementations, the computer-readable media 1304 may store data, such as measured geometric offsets 1320 and calibration data 1322 useful for determining if the system and vehicle are operating as expected as well as providing calibration, compensation and validation for sensor data processing.

The vehicle body angle obtaining modules 1308 may be configured to determine the rotational angles of the vehicle body from data received from one or more IMU sensors mounted on the vehicle body and/or one or more GNSS sensors mounted on the vehicle body. Similarly, the implement angle obtaining module 1310 may be configured to determine the rotational angles of the implement from data received from one or more IMU sensors mounted on the implement. The coordinate conversation module 1312 may be configured to convert LLA coordinates identified by the GNSS sensors into ENU coordinates for controlling the vehicle. The angle determining module 1314 may be configured to convert the data collected by the various IMU and/or gyroscopes into the rotation angles of the various components of the vehicle (such as the vehicle body, lift frame, or the implement). The target point coordinate determining module 1316 may be configured to translate coordinates of a reference point into coordinates of a target point using the measured geometric offsets 1320, as described above.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system for configuring a vehicle having an implement for autonomous movement comprising:
    a first measurement unit mounted on a body of the vehicle, the first measurement unit to collect first data associated with a movement and rotation of the body of the vehicle;
    a second measurement unit mounted on the implement of the vehicle, the second measurement unit to collect second data associated with a movement and a rotation of the implement of the vehicle;
    a first global positioning sensor mounted on the body of the vehicle, the first global positioning sensor to decode third data associated with a coordinate of the first global positioning sensor from a satellite signal; and
    a position recognizing system, including at least one processor to perform operations including to:
        determine a pitch angle, a roll angle, and a yaw angle associated with a body point of interest based at least in part on the first data;
        determine a coordinate associated with the body point of interest based at least in part on the third data associated with the coordinate of the first global positioning sensor and a first geometric offset between the first global positioning sensor and the body point of interest; and
        determine a pitch angle, a roll angle, and a yaw angle associated with an implement point of interest based at least in part on the second data;
        determine a coordinate associated with the implement point of interest based at least in part on the third data associated with the coordinate of the first global positioning sensor, a second geometric offset between the first global positioning sensor and a first reference point, and a third geometric offset between the first reference point and the implement point of interest.

2. The system as recited in claim 1, wherein the first measurement unit includes a gyroscope.

3. The system as recited in claim 1, wherein the body point of interest is a gravitational center of the vehicle along a bottom plane of the vehicle.

4. The system as recited in claim 1, wherein the position recognizing system is remote from the vehicle.

5. The system as recited in claim 1, further comprising:
    a second global positioning sensor mounted on the body of the vehicle, the second global positioning sensor to decode fourth data associated with a coordinate of the second global positioning sensor from the satellite signal; and
    wherein the position recognizing system determines the body point of interest based at least in part on the coordinate of the second global positioning sensor.

6. The system as recited in claim 1, wherein the first reference point is associated with a lift frame.

7. The system as recited in claim 1, further comprising:
    a third measurement unit mounted on a lift frame of the vehicle, the third measurement unit to collect fourth data associated with a pitch angle, a roll angle, and a yaw angle associated with the lift frame; and
    wherein the position recognizing system determines the implement point of interest based at least in part on the pitch angle, the roll angle, and the yaw angle associated with the lift frame.

8. The system as recited in claim 1, wherein the position recognizing system provides the coordinates of the body point of interest and the coordinates of the implement point of interest to a remote system via a wireless communication channel.

9. The system as recited in claim 1, wherein the position recognizing system alters a trajectory of the vehicle based at least in part on the coordinates of the body point of interest and the coordinates of the implement point of interest.

10. An earthmoving vehicle comprising:
    a vehicle body;
    an implement disposed forward of the vehicle body;
    an implement support including a lift frame;
    a first measurement unit mounted on the vehicle body, the first measurement unit to collect data associated with a movement and rotation of the vehicle body;
    a second measurement unit mounted on the implement of the vehicle, the second measurement unit to collect data associated with movement and a rotation of the implement;
    a first global positioning sensor mounted on the vehicle body, the first global positioning sensor to decode third data associated with a first set of coordinate associated with the first global positioning sensor from a satellite signal; and
    a position recognizing system mounted on the vehicle body, the position recognizing system including at least one processor to perform operations to:
        determine a pitch angle, a roll angle, and a yaw angle associated with a body point of interest based at least in part on the first data;
        determine a coordinate associated with the body point of interest based at least in part on the third data associated with the coordinate of the first global positioning sensor and a first geometric offset between the first global positioning sensor and the body point of interest; and
        determine a pitch angle, a roll angle, and a yaw angle associated with an implement point of interest based at least in part on the second data;
        determine a coordinate associated with the implement point of interest based at least in part on the third data associated with the coordinate of the first global positioning sensor, a second geometric offset between the first global positioning sensor and a first reference point, and a third geometric offset between the first reference point and the implement point of interest.

11. The earthmoving vehicle as recited in claim 10, wherein the implement is at least one of:
    a blade;
    a bucket; or
    a shovel.

12. The earthmoving vehicle as recited in claim 10, wherein:
implement point of interest is along the bottom of the implement.

13. The earthmoving vehicle as recited in claim 10, wherein:
the vehicle body includes a bottom plane and the body point of interest is located at a gravitational center of the bottom plane.

14. The earthmoving vehicle as recited in claim 10, further comprising
a third measurement unit mounted on the lift frame, the third measurement unit to collect data associated with rotational angles of the lift frame;
wherein the lift frame includes a first point of attachment to the vehicle body and a second point of attachment to the vehicle body, the lift frame having a lift frame origin point positioned between the first point of attachment and the second point of attachment; and
wherein the position recognizing system:
determines coordinates associated with the lift frame origin point based at least in part on a first geometric offset between the first global positioning sensor and the lift frame origin point.

15. The earthmoving vehicle as recited in claim 10, further comprising:
a third measurement unit mounted on the lift frame, the third measurement unit to collect data associated with a pitch angle, a roll angle, and a yaw angle associated with the lift frame;
wherein the lift frame includes a first point of attachment to the vehicle body and a second point of attachment to the vehicle body, the lift frame having a lift frame origin point positioned between the first point of attachment and the second point of attachment, and the lift frame attaches to the implement at a third point of attachment;
and
wherein an implement origin point is located at the third point of attachment; and
wherein the position recognizing system:
determines coordinates associated with the lift frame origin point based at least in part on the a first geometric offset between the first global positioning sensor and the lift frame origin point; and
determines coordinates associated with the implement origin point based at least in part on the pitch angle, the roll angle, and the yaw angle associated with the lift frame, the coordinates associated with the lift frame origin point, and a third known geometric offset between the lift frame origin point and the implement origin point.

16. The vehicle as recited in claim 10, further comprising:
a second global positioning sensor mounted on the vehicle body, the second global positioning sensor to decode data associated with a third set of coordinates associated with the second global positioning sensor from a satellite signal; and
wherein the position recognizing system determines the coordinate associated with the implement point of interest based at least in part third set of coordinates.

17. An method comprising:
receiving first data from a first measurement unit mounted on a body of the vehicle, the first data associated with a movement and a rotation of the body of the vehicle;
receiving second data from a second measurement unit mounted on an implement of a vehicle, the second data associated with a movement and rotations of the implement;
receiving first global positioning sensor data from a first global positioning sensor mounted on the vehicle body, the first global positioning sensor to decode third data associated with a first set of coordinates associated with the first global positioning sensor from a satellite signal;
determining a pitch angle, a roll angle, and a yaw angle associated with a body point of interest based at least in part on the first data;
determining a coordinate associated with the body point of interest based at least in part on the third data associated with the coordinate of the first global positioning sensor and a first geometric offset between the first global positioning sensor and the body point of interest; and
determining a pitch angle, a roll angle, and a yaw angle associated with an implement point of interest based at least in part on the second data;
determining a coordinate associated with the implement point of interest based at least in part on the third data associated with the coordinate of the first global positioning sensor, a second geometric offset between the first global positioning sensor and a first reference point, and a third geometric offset between the first reference point and the implement point of interest.

18. The method as recited in claim 17, further comprising
receiving fourth data from a third measurement unit mounted on the lift frame, the fourth data associated with the pitch angle, the roll angle, and the yaw angle associated with the lift frame.

19. The method as recited in claim 17, wherein the first reference point is associated with a lift frame.

20. The method as recited in claim 17, wherein: the body point of interest is a gravitational center of the vehicle along a bottom plane of the vehicle
body point of interest is located at a gravitational center of a bottom plane of the vehicle.

* * * * *